(12) United States Patent
Burton et al.

(10) Patent No.: US 9,575,690 B2
(45) Date of Patent: Feb. 21, 2017

(54) SUB-LUN AUTO-TIERING

(71) Applicant: Oracle International Corporation, Redwood City, CA (US)

(72) Inventors: David Alan Burton, Vail, CO (US); Kenneth Harris, Boulder, CO (US); Erich Otto, Longmont, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/340,700

(22) Filed: Jul. 25, 2014

(65) Prior Publication Data

US 2014/0337576 A1    Nov. 13, 2014

Related U.S. Application Data

(63) Continuation-in-part of application No. 14/171,753, filed on Feb. 3, 2014, now abandoned, which is a continuation of application No. 13/358,453, filed on Jan. 25, 2012, now Pat. No. 8,645,662.

(60) Provisional application No. 61/580,040, filed on Dec. 23, 2011.

(51) Int. Cl.
*G06F 12/00* (2006.01)
*G06F 3/06* (2006.01)

(52) U.S. Cl.
CPC .............. *G06F 3/0665* (2013.01); *G06F 3/061* (2013.01); *G06F 3/0649* (2013.01); *G06F 3/0689* (2013.01); *G06F 3/064* (2013.01); *G06F 3/0685* (2013.01)

(58) Field of Classification Search
CPC ...... G06F 3/0665; G06F 3/0689; G06F 3/061; G06F 3/064; G06F 3/0649; G06F 3/0685
See application file for complete search history.

(56) References Cited

U.S. PATENT DOCUMENTS

| 8,645,662 | B2* | 2/2014 | Burton | G06F 3/0611 |
| | | | | 711/114 |
| 8,972,694 | B1* | 3/2015 | Dolan | G06F 13/00 |
| | | | | 711/170 |
| 2011/0167236 | A1* | 7/2011 | Orikasa | G06F 3/0608 |
| | | | | 711/165 |
| 2012/0072662 | A1* | 3/2012 | Jess | G06F 12/0653 |
| | | | | 711/114 |

\* cited by examiner

*Primary Examiner* — Kalpit Parikh
(74) *Attorney, Agent, or Firm* — Marsh Fischmann & Breyfogle LLP; Daniel J. Sherwinter

(57) ABSTRACT

Embodiments of the invention include systems and methods for auto-tiering multiple file systems across a common resource pool. Storage resources are allocated as a sub-LUN auto-tiering (SLAT) sub-pool. The sub-pool is managed as a single virtual address space (VAS) with a virtual block address (VBA) for each logical block address of each data block in the sub-pool, and a portion of those VBAs can be allocated to each of a number of file systems. Mappings are maintained between each logical block address in which file system data is physically stored and a VBA in the file system's portion of the virtual address space. As data moves (e.g., is added, auto-tiered, etc.), the mappings can be updated. In this way, multiple SLAT file systems can exploit the full resources of the common SLAT sub-pool and maximize the resource options available to auto-tiering functions.

14 Claims, 10 Drawing Sheets

ID AUTO-TIERING

BACKGROUND

Embodiments relate generally to data storage environments, and, more particularly, to auto-tiering of file systems in data storage systems within a common resource pool.

Many types of storage devices are available for storing data, each type having an associated cost, access speed, reliability, etc. Multiple storage devices of the same or different types can be provided as a resource pool, which may be managed as a storage system in which logical storage units can be identified by logical unit numbers (LUNs). The LUNs are often used to store file systems, which are typically collections of data relating to an application or group of applications. Notably, different types of file system data, even within a single file system, may be accesses frequently or infrequently, sequentially or non-sequentially, or in other ways. As such, optimizing a storage system (e.g., cost, throughput, etc.) can involve allocating appropriate amounts of appropriate types of LUNs to a file system.

One traditional approach is to choose a single, best type of LUN to use for storing file system data, accounting for trade-offs between various LUN metrics. Different types of storage can only be exploited by swapping out one or more of the original LUNs with a different type of LUN and moving some or all of the file system data. Another traditional approach is to choose two or more types of LUN, categorized into two or more storage classes, and to store different portions of the file system in those different storage classes. This approach allows exploitation of different storage types, but only through manual movement of the data between the storage classes and typically only within fixed LUNs (or partitions of LUNs) allocated to the particular file system.

For example, a data storage system is commonly used to store multiple file systems concurrently, and that each file system is guaranteed a certain capacity. That capacity can be ensured by selecting a subset of available LUNs in the storage system, or by generating fixed partitions within LUNs, to associate with each file system. All file system data is stored only on those LUNs and/or partitions, and those LUNs and/or partitions provide at least the guaranteed capacity. In this type of environment, data can be promoted or demoted between storage classes only through very coarse, manual operations, such as by moving an entire file system to a new LUN or by swapping out an entire LUN.

More recently, auto-tiering approaches became available. As with the preceding approach, a system administrator selects LUNs or partitions within LUNs as a priori resource allocations for file systems. A storage manager is used to monitor usage by the file systems of their respective allocated resources (e.g., data blocks). The storage manager can move file system data to data blocks of different storage classes within the file system's allocated resources. For example, some systems always store new data by default to the most expensive storage class, and the data can be promoted or demoted over time depending on how often and/or in what manner the data is accessed. Other systems initially store data according to an a priori quality of service characterization of the file system or the file system data (e.g., by the system administrator) and move the data, as needed, to optimize performance. While these auto-tiering techniques can appreciably improve performance of many file systems, they are still limited in a number of ways. For example, many such systems can promote or demote data only within the a priori allocations associated with a file system, only at the LUN level, etc.

BRIEF SUMMARY

Among other things, systems and methods are described for providing auto-tiering functionality for multiple file systems across a common resource pool. Embodiments operate in a file system stored in block storage across a virtualized storage system having a number of storage classes (each having logical storage units identified by logical unit numbers, or LUNs). Some or all of a resource pool (i.e., a set of logical block addresses that identify data blocks) is allocated for use as a sub-LUN auto-tiering (SLAT) sub-pool. The SLAT sub-pool is managed as a single virtual address space with a virtual block address for each logical block address of the SLAT sub-pool. A SLAT file system can be generated by allocating and associating a portion of the single virtual address space as its set of virtual block addresses. Mappings are maintained between each logical block address in which file system data is physically stored and a virtual block address in the SLAT file system's virtual address space. As data operations occur (e.g., data is added, removed, promoted or demoted due to auto-tiering operations, etc.), the mappings are updated accordingly. In this way, multiple SLAT file systems can exploit the full resources of the common SLAT sub-pool and maximize the resource options available to auto-tiering functions.

According to one set of embodiments, a method is provided for auto-tiering in a storage resource pool having a number of storage classes, each with one or more storage devices configured to store data blocks. The method includes: updating first and second sets of block access statistics maintained by a storage manager of a sub-LUN auto-tiering (SLAT) file system in response to performing one or more block-level operations on one or more data blocks of the SLAT file system, the SLAT file system being implemented in a virtual address space mapped by the storage manager to one or more of a number of logical block addresses, each corresponding to a data block of a SLAT sub-pool that includes a portion of storage resources of each of at least two storage classes, the one or more data blocks being of a first storage class; determining whether to promote file data stored in the one or more data blocks according to the first set of updated block access statistics or to demote the file data according to the second set of updated block access statistics; moving the file data to data blocks of a second storage class when it is determined to promote the file data; and moving the file data to data blocks of a third storage class when it is determined to demote the file data.

According to another set of embodiments, a data storage system is provided. The data storage system includes: a number of storage classes, each having one or more storage devices configured to store a plurality of data blocks; a top-level storage manager configured to manage storage resources across the storage classes; and a sub-LUN auto-tiering (SLAT) storage manager. The SLAT storage manager is configured to: manage a SLAT sub-pool including a portion of storage resources of each of at least two of the storage classes allocated from the top-level storage manager; generate a common SLAT address space having a number of logical block addresses each corresponding to a data block of the SLAT sub-pool; map, according to a SLAT mapping, at least one of the logical block addresses in the SLAT address space to a virtual address space of a predetermined total capacity assigned to a SLAT file system; and maintain first and second sets of block access statistics, each relating to a count of block-level operations on associated data blocks of the SLAT file system, the first set of block access statistics being different from the second set of block access statistics.

According to a third set of embodiments, a computer-implemented sub-LUN auto-tiering (SLAT) storage manager system is provided. The SLAT storage manager is in communication with a number of storage classes, each having one or more storage devices configured to store a plurality of data blocks, and is in communication with a top-level storage manager configured to manage storage resources across the storage classes. The SLAT storage manager system includes: a set of processors and a non-transient memory having instructions stored thereon, which, when executed, cause the set of processors to perform steps. The steps include: managing a SLAT sub-pool including a portion of storage resources of each of at least two of the storage classes allocated from the top-level storage manager, such that the SLAT sub-pool comprises a common SLAT address space having a number of logical block addresses each corresponding to a data block of the SLAT sub-pool, and at least one of the logical block addresses in the SLAT address space is mapped, according to a SLAT mapping, to a virtual address space of a predetermined total capacity assigned to a SLAT file system; and updating first and second sets of block access statistics in response to performing one or more block-level operations on one or more data blocks of the SLAT file system.

BRIEF DESCRIPTION OF THE DRAWINGS

The present disclosure is described in conjunction with the appended figures.

Figure 1:
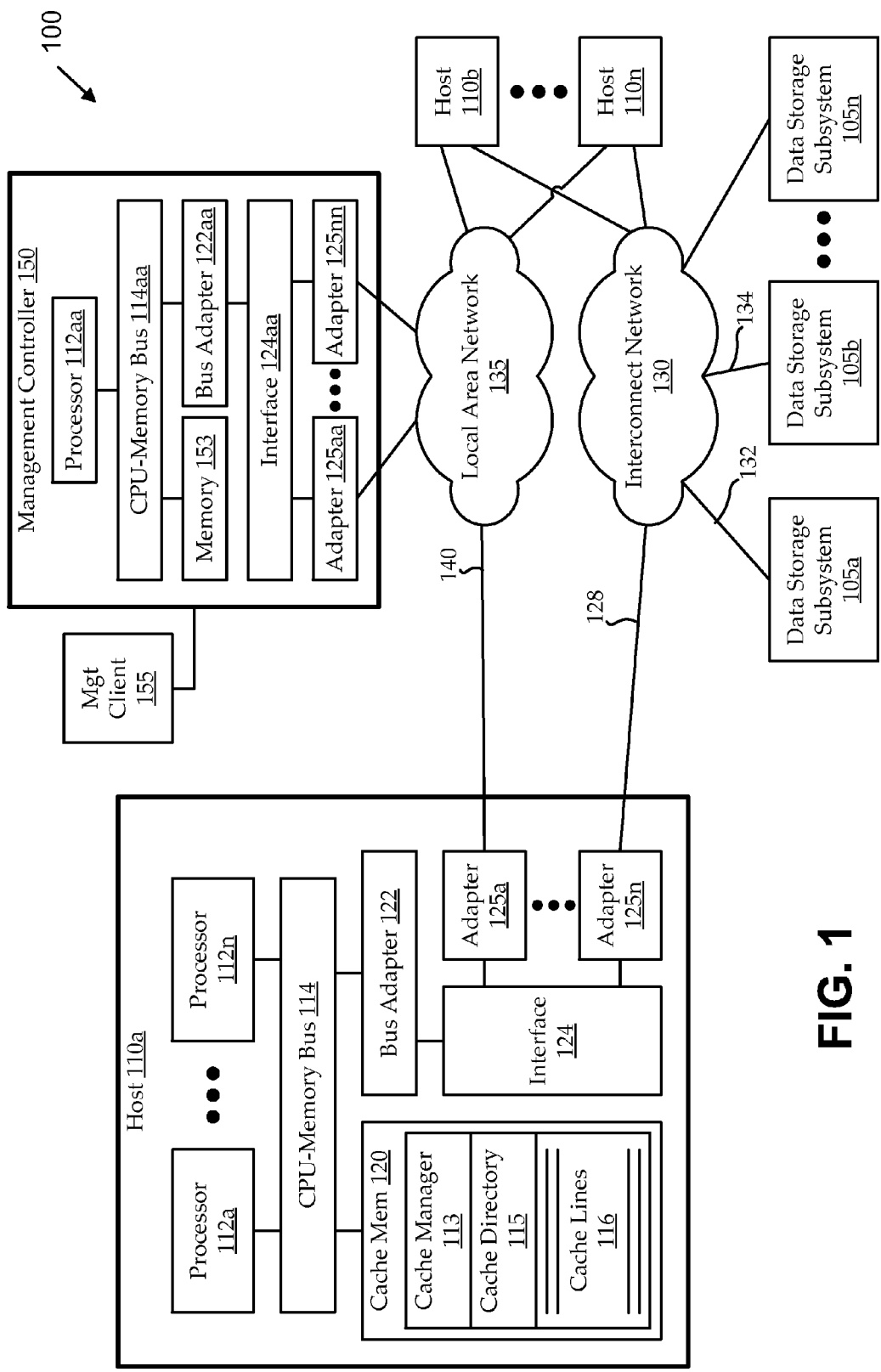
FIG. 1 shows a block diagram of an illustrative data storage system, including a number of hosts coupled to one or more data storage subsystems, to provide a context for various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Embodiments operate in storage systems having multiple storage classes configured or being used to store multiple file systems. As used herein, "file systems" intend generally to refer to any similar type of file storage environment, including, for example, traditional file systems (e.g., with files arranged in directories), storage area network logical unit numbers (SAN LUNs), etc.). A storage system provides a resource pool that can be allocated and managed at different levels. Each storage class in the storage system can have one or more storage devices (logical storage units identified by logical unit numbers, or LUNs) of one or more different types, such that each storage class represents a class of performance (e.g., with an associated cost, access speed, reliability, etc.). Indeed, some contexts are such that all data can be stored in the most expensive storage classes, or that all data can be stored in a single storage class without performance losses. However, the storage systems, types of file systems being stored in the storage systems, and other aspects of this description are assumed to be of the types that can benefit from tiering of data in general and auto-tiering in particular. As such, while the descriptions focus on auto-tiered file systems, certain system and method embodiments described herein can also be used with non-auto-tiered file systems.

Some traditional uses of storage systems include storing file systems on one or more LUNs or LUN partitions, or tiering storage of file systems across LUNs in multiple storage classes according to a priori allocations. However, these uses are largely ignore different characterizations of the data being stored (e.g., whether data is accessed frequently or infrequently, sequentially or non-sequentially, etc.), and tend, accordingly, to be sub-optimal in terms of storage system cost, throughput, etc. Other traditional techniques attempt to use a priori allocations across storage classes for optimization purposes, such that appropriate amounts of resources from appropriate types of LUNs are devoted to each file system. For example, certain traditional techniques can exploit the a priori allocations to provide some manual or automatic promotion or demotion of data in the file systems to different storage classes. Notably, however, these techniques still tend to be limited to coarse operations, for example, promoting or demoting data only at the LUN level or strictly within the a priori resource allocations.

For example, some traditional systems employ third party archiving and hierarchical storage management (HSM) software to migrate data from expensive high performance storage devices (e.g., Fibre channel) to lower cost storage devices such as tape or Serial ATA storage devices. Archival and HSM software manage separate storage volumes and file systems. Archival software not only physically moves old data but typically removes the file from the original file namespace. Although symbolic links can simulate the original namespace, this approach may involve provisioning the target storage as another file system, which can increase the IT administrator workload.

Archival and HSM software also do not tend to integrate well with snapshots and similar functions. Older data is more likely to be part of multiple snapshots, and archival software that moves old data does not typically free snapshot space on high performance storage. HSM software works at the virtual file system and i-node level, and is typically unaware of the block layout of the underlying file system or the block sharing among snapshots when it truncates the file in the original file system. With the two data stores approach, the user quota is typically enforced on only one data store, that is, the primary data store. Also, each data store typically has its own snapshots and these snapshots are not coordinated.

Archival software also does not control initial file placement and is inefficient for a large class of data that ultimately ends up being archived. Since archival software is not privy to initial placement decisions, it will not provide different quality of service (QoS) in a file system to multiple users and data types. Archival software also tends to consume production bandwidth to migrate the data, and is therefore typically scheduled only for non-production times to minimize interference with production uses of the data. This type of scheduling is difficult or impossible for data that is accessed at all hours, and the archiving software is not typically optimized otherwise to leverage idle bandwidth of the storage system.

Embodiments described herein provide auto-tiering with more optimization potential at least because the auto-tiering can be accomplished with more resources and at a finer (e.g., sub-LUN or block level) resolution. Some or all of the storage resources in the resource pool of the storage system (i.e., a set of logical block addresses that identify data blocks) is allocated for use as a sub-LUN auto-tiering (SLAT) sub-pool. The SLAT sub-pool is managed as a single virtual address space with a virtual block address for each logical block address of the SLAT sub-pool. File systems are allocated capacity (i.e., a set of virtual block addresses representing an amount of storage) within the SLAT virtual address space. Mappings are maintained between each logical block address in which file system data is physically stored and a virtual block address in the SLAT file system's virtual address space. As data operations occur (e.g., data is added, removed, promoted or demoted due to auto-tiering operations, etc.), the mappings are updated accordingly.

In this way, embodiments provide a number of features. One such feature is that the auto-tiering functions have access to the entire resource sub-pool for data tiering, and not just to resources in an a priori allocation. This can allow the system to have more resources for performing auto-tiering functions, more options for how to tier data, etc. In a traditional auto-tiered environment, for example, each file system is walled off into its separate resource allocation, and one file system's data cannot be promoted or demoted with respect to another file system's data. Using SLAT techniques, auto-tiering determinations can be made with respect to all data in all SLAT file systems while still guaranteeing a particular resource capacity to each SLAT file system. Another such feature is that the auto-tiering can be performed at the sub-LUN, or even block, level. For example, a virtual block address of a SLAT file system can be mapped to the logical block address of any available data block across the entire SLAT sub-pool, regardless of whether that block (or any block in that particular LUN or storage class) had been allocated to or previously used by the SLAT file system.

Turning first to FIG. 1, a block diagram is shown of an illustrative data storage system 100, including a number of hosts 110 coupled to one or more data storage subsystems 105, to provide a context for various embodiments. That there has been a trend toward data storage systems 100 being used to handle larger and more numerous files for longer periods of time. In that context, the portion of file data that is "active data" tends to shrink, which can cause inefficient use of more expensive, higher performance storage classes. This can impact input/output operations, data storage backups, lifecycle management and compliance, and other functions.

For example, the Internet, e-commerce, and relational databases have all contributed to a tremendous growth in data storage requirements and have created an expectation that the data should be readily available at any and all times. The desire to manage data growth and produce high data availability has encouraged development of storage area networks (SANs) and network-attached storage (NAS). SANs move networked storage behind hosts 110, and typically have their own topology that do not rely on local area network (LAN) protocols, such as Ethernet. NAS architectures free storage from direct attachment to a host 110. The NAS storage array becomes a network addressable device using standard network file systems, TCP/IP, and Ethernet protocols. However, both SAN and NAS topologies typically employ at least one host 110 connected to data storage subsystems 105 containing storage devices. Each data storage subsystem 105 typically contains multiple storage nodes where each node includes a storage controller and an array of storage devices (e.g., magnetic disk (hard disk drive) or magnetic tape drives). The data storage subsystems 105 may be referred to collectively as a "resource pool."

Each host 110 is a computer that can connect to clients, to data storage subsystems 105, and to each other. The host 110 can makes requests (e.g., reads and writes) of the data storage subsystems 105. Each application (e.g., file system data, as described more fully below) that is the subject of the request may require or desire different qualities of service (QoS). For efficiency, each host 110 can accumulate a batch of requests from application users and transmit them to the data storage subsystem 105, or perform other optimization functions. Generally, the host 110 operates to ensure that all requests are completed in a reasonable time, all applications are simultaneously supported, and appropriate performance is delivered to each application. Each host 110 provides software and/or hardware interfaces, such as network interface cards and software drivers to implement Ethernet, Fibre Channel (FC), ATM, SCSI, InfiniBand, and/or any other type of interface.

In one embodiment, a first host 110a includes a motherboard with a CPU-memory bus 114 that communicates with one or more processors 112 (e.g., dual processors). A processor 112 could be any suitable general-purpose processor running software, an ASIC dedicated to perform the operations described herein, a field programmable gate array (FPGA), etc. Also, one could implement embodiments using a single processor 112 in each host 110 or more than two processors 112 to meet more stringent performance requirements.

The first host 110a has cache memory 120 that includes a cache manager 113, a cache directory 115, and cache lines 116. The cache memory 120 is nonvolatile memory, volatile memory, or a combination of both. Nonvolatile memory protects data in the event of a power interruption or a host failure. Data includes user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

Each host 110 can include a bus adapter 122 between the CPU-memory bus 114 and an interface bus 124. Each host runs an operating system, such as Linux, UNIX, a Windows OS, or another suitable operating system. The first host 110a can communicate with the second host 110b through an interconnect 140, shown as connected to an adapter 125a to the interface bus 124. The PCI bus is one suitable interface bus 124. As illustrated, the interconnect 140 may be (or may pass through) pass through a local area network (LAN)), though the interconnect 140 may be any suitable known bus, SAN, LAN, or WAN technology, or the like. In one embodiment, the interconnect 140 is a dedicated, FC, point-to-point link that connects to FC-PCI bus adapter 125 to provide fast point-to-point communication between the hosts 110.

In an alternative embodiment, the interconnect network 130 (e.g., a FC fabric) provides extra bandwidth for host-to-host communications. In this embodiment, link 128 connects to the interconnect network 130, and the hosts 110 use link 128 when available. FC standard software can set priority levels to ensure high priority peer-to-peer requests, but there can still be some arbitration overhead and latency in claiming ownership of the links. For example, if link 128 is busy transferring data when a write request arrives, that operation must complete before it is free for arbitration.

If the interconnect 140 ever fails, communication between hosts 110 can be handled using the interconnect network 130. The interconnect network 130 can be implemented by interconnects used in data storage systems such as FC, SCSI, InfiniBand, Ethernet, etc. Embodiments can use redundant communication between hosts 110 to ensure the data storage system 100 has high availability. As illustrated, the first host 110a can connect, or couple, to the first data storage subsystem 105a through the bus adapter 122, the interface bus 124, the adapter 125n, the link 128, the interconnection network 130, and the link 132. To connect to the second data storage subsystem 105b, the first host 110a can use the same I/O path, except the data passes through link 134. The second host 110b can use the same type of I/O path plus link 132 to communicate with the first data storage subsystem 105a or link 134 to communicate with the second data storage subsystem 105b.

As will be described more fully herein, operations are performed on blocks of the data storage subsystems 105. In some embodiments, the data storage subsystems 105 are implemented substantially as described in U.S. patent application Ser. No. 10/264,603, entitled "SYSTEMS AND METHODS OF MULTIPLE ACCESS PATHS TO SINGLE PORTED STORAGE DEVICES," filed on Oct. 3, 2002, now abandoned; and U.S. application Ser. No. 10/677,560, entitled "SYSTEMS AND METHODS OF MULTIPLE ACCESS PATHS TO SINGLE PORTED STORAGE DEVICES," filed on Oct. 1, 2003, now abandoned; both of which are incorporated herein by reference. It is understood, however, that other storage device(s) or data storage subsystems 105 could be used in other embodiments.

In some embodiments, a host 110 accesses storage devices (e.g., hard disk drives) in the data storage subsystems 105 through a VLUN (virtual logical unit number) that abstracts the storage device(s) as a linear array of fixed-size blocks. A logical block address (LBA) identifies each fixed-sized block. As used herein, each LBA has a fixed association with a data block of a physical volume (which may be represented as part of a VLUN). Some embodiments described herein map virtual block addresses (VBAs) to some or all of the LBAs to provide a more dynamic association (e.g., a layer of abstraction) between the addresses and the physical blocks to which they refer. The data storage system constructs a VLUN from all or parts of several physical storage devices such as disk drives. To make a large VLUN, a data storage system may concatenate space allocated from several storage devices. In certain embodiment, techniques are used to improve performance, such as the data storage system 100 can map adjacent regions of VLUN space onto different physical storage devices (striping), the data storage system 100 can hold multiple copies of a VLUN on different storage devices (mirroring), etc.

Performance of certain functions, such as auto-tiering functions, may involve management of host functions using a storage manager, which can include a management controller 150 and a management client 155. The management controller 150 may be implemented substantially as one of the hosts 110, or similar. The management client 155 communicates (e.g., using Ethernet) with the management controller 150, and may provide an interface by which users (e.g., an IT administrator) can make high level choices to configure the data storage system 100. In some embodiments, the management client 155 includes hardware, plus display and input devices, such as a keyboard and mouse. For example, the management client 155 can be used to provision file systems, QoS VLUNS, etc. with initial, incremental, and/or maximum capacities of storage resources.

As shown, embodiments of the management controller 150 include a CPU-memory bus 114aa that communicates with a processor 112aa and a memory 153 (e.g., which may be implemented differently from the cache memory 120 of the hosts 110). The management controller 150 includes a bus adapter 122aa between the CPU memory bus 114aa and an interface bus 124aa interfacing with network adapters 125aa-125nn. The management controller 150 can communicate with the hosts 110 through its network adaptors 125 and the LAN 135. In that way, the management controller 150 can direct operations of the hosts 110, thereby controlling operations of the storage system 100.

Figure 2:
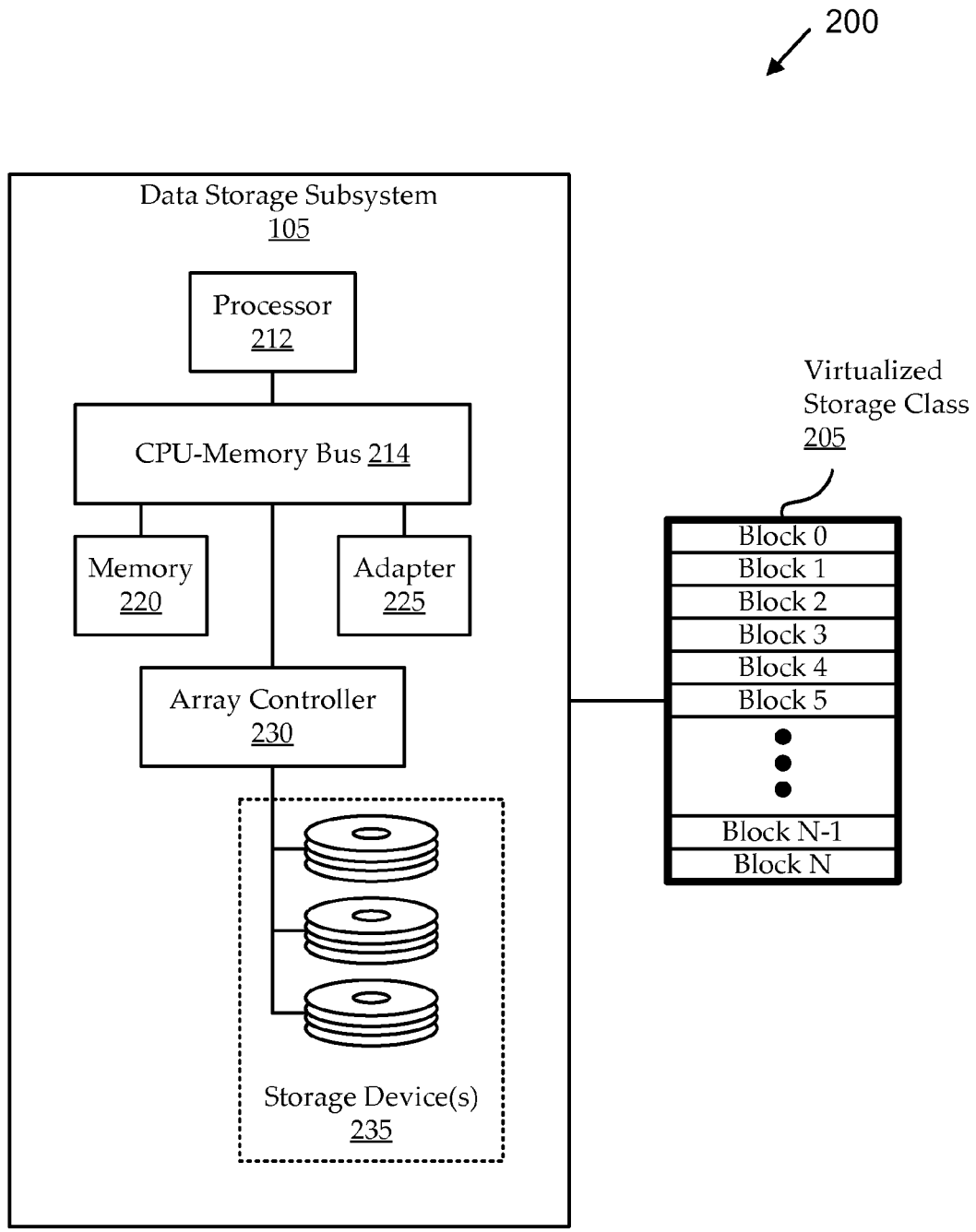
FIG. 2 shows a simplified block diagram of a portion of an illustrative data storage system, like the one described with reference to FIG. 1, focusing on an illustrative data storage subsystem, according to various embodiments.

FIG. 2 shows a simplified block diagram of a portion of an illustrative data storage system 200, like the one described with reference to FIG. 1, focusing on an illustrative data storage subsystem 105, according to various embodiments. The data storage subsystem 105 includes a CPU-memory bus 214 that communicates with a processor 212 and a memory 220. The processor 212 can be any suitable processor, such as an Intel Pentium processor, an application-specific integrated circuit (ASIC) dedicated to perform the operations described herein, a field programmable gate array (FPGA), etc. The CPU-memory bus 214 communicates through an adapter 225 and a link with the storage interconnect network (e.g., link 132 and storage interconnect network 130 of FIG. 1) and through a link to an array controller 230 (e.g., a RAID controller), interfacing with an array of storage devices 235 (e.g., a disk array). In alternative embodiments, other suitable array controllers 230 and/or compatible storage device(s) 235 can be used (e.g. tape drives or semiconductor memory) in the data storage subsystem 105.

Each data storage subsystem 105 or groups of one or more data storage subsystems 105 can be considered a storage class. Each storage class may include storage devices 235 that are substantially identical, of similar type, perform within a similar range of performance metrics, etc. In an illustrative embodiment, available storage classes are "high priority," "medium priority," "low priority," and "archive priority." Each of these storage classes may include one or more acceptable drive types for providing the desired storage class performance (e.g., FC storage, serial ATA drives, SCSI drives, tape drives, solid state drives, etc.), a RAID level according to which data is stored in the storage class (e.g., RAID-5 or RAID-10), etc. Notably, a single storage device can be used to provide multiple storage classes (e.g., using different locations on the drive, different amounts of redundancy, different RAID levels, etc.); or many different storage devices can be used within a single storage class. For the sake of clarity, the blocks of a storage class, whether physically in a single data storage system 105 or in multiple data storage systems 105, are shown as part of a single "virtualized" storage class 205.

In some embodiments, each storage device in a data storage subsystem 105 is assigned a logical unit number (LUN) that is an identifier for the storage device. A virtual logical unit number (VLUN) is as an abstraction of the storage device or a group of storage devices, or the virtualization of the data storage subsystems 105. For example, each data storage subsystem 105 or storage class can be described as a VLUN that represents a linear array of blocks as it appears to the file system users. In various embodiments, the implementation of a VLUN may be striped (i.e., spread) over multiple RAID groups for added performance, spread over sections of a RAID group for flexibility, or copied on multiple RAID groups for reliability. The storage devices and/or storage classes may employ contiguous fixed-sized blocks 0-N, where the size of each block is some value (e.g., between one and 64 kilobytes), as illustrated by the virtualized storage class 205.

The data storage subsystems 105 are used to store file systems, so that a single file system may include blocks that span one or more data storage subsystems 105. Accordingly, when a host 110 accesses blocks of data in a file system, it may be accessing blocks across multiple data storage subsystems 105 and/or across multiple storage classes. In an enterprise email application, for example, certain data (e.g., index files) is accesses and changed very often by many end users, while other data (e.g., archived emails) is rarely accessed, if ever. Accordingly, the email application data can be stored as a file system having data that spans multiple access priority levels, and efficient and effective use of multiple storage classes to store the file system data can appreciably improve performance of the application.

It will be appreciated that different file systems may be stored and/or managed differently. Various techniques exist for storing a single file system across multiple qualities of service or storage classes by pre-allocating portions of each storage class for use by the file system and allowing data to be promoted or demoted within those allocations. Typically, a system administrator decides on the allocations based on experience, best practices, application guidelines, application requirements, etc. These allocations are then effectively fixed (resources can be added to the allocation in some implementations, but resources typically cannot be removed from the allocation). For example, the system administrator may select for a file system a fixed portion of a high-priority storage class, a fixed portion of a medium-priority storage class, and a fixed portion of an archive-priority storage class. The portion of storage resources from each storage class (i.e., a number of data blocks spanning one or more storage devices in the storage class) is then partitioned or otherwise dedicated to that file system. Techniques can be used to perform auto-tiering or other operations to move data around for greater performance yield, but only at a LUN level or only within the pre-allocated portions of the storage classes. Some illustrative techniques for storing a file system according to multiple qualities of services are described in U.S. patent Ser. No. 11/245,718, titled "MULTIPLE QUALITY OF SERVICE FILE SYSTEM," filed Oct. 8, 2005, now abandoned, which is incorporated herein by reference.

While performance can be appreciably improved by auto-tiering, even within a prior allocations and even at the LUN level, additional performance improvements can be realized from sub-LUN auto tiering (SLAT) techniques described herein. Embodiments allocate some or all of the resources of the storage pool to a common set of storage resources that can be used for SLAT operations. The common set of storage resources is virtualized as a single virtual address space within which file systems can be allocated a defined portion (e.g., a capacity). A mapping is maintained between the portion of the virtual address space allocated to the file system and the actual, logical blocks in which data is stored for that file system. In this way, it is possible for multiple file systems to dynamically share and use the entire set of SLAT resources for auto-tiering without being restricted to a priori allocations or LUN-level operations.

Figure 3:
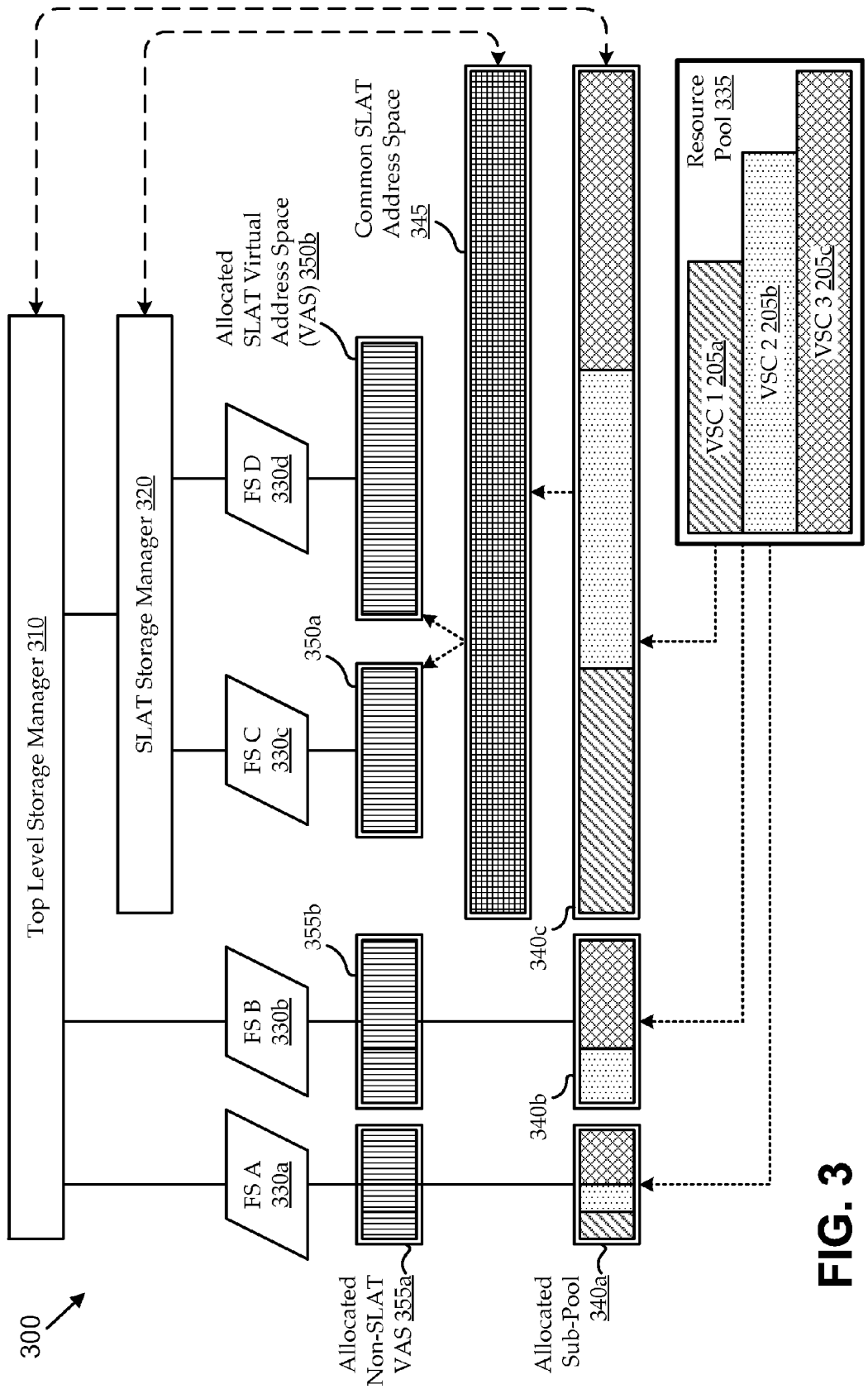
FIG. 3 shows an illustrative storage environment in which both SLAT and non-SLAT file systems can be stored and managed, according to various embodiments.

FIG. 3 shows an illustrative storage environment 300 in which both SLAT and non-SLAT file systems can be stored and managed, according to various embodiments. The various drives, data storage subsystems 105, storage classes, etc. of the storage environment can be considered as a resource pool 335. For the sake of illustration, resource pool 335 includes three virtual storage classes (VSC) 205, each of which may have one or more storage devices, etc., as described above. The resource pool 335 is managed by a top-level storage manager 310. In some embodiments, the top-level storage manager 310 is the management controller 150 described with reference to FIG. 1.

File systems for which traditional (i.e., non-SLAT) auto-tiering is desired may be created and managed by the top-level storage manager 310. As illustrated, a portion of each of the three VSCs 205 in the resource pool 335 is allocated to a first allocated sub-pool 340a. The first allocated sub-pool 340a can be considered as a virtual address space (first allocated non-SLAT VAS 355a) having an array of data blocks that point directly to logical blocks of the first allocated sub-pool 340a. The first allocated non-SLAT VAS 355a can then be associated with a first (non-SLAT) file system 330a. Notably, any changes in priority for the file system 330a can only be accomplished by moving data around within the first allocated sub-pool 340a (i.e., the a priori allocation of resources), physically changing out LUNs (e.g., swapping a lower-performance drive for a higher-performance drive), or adding resources to the resource pool 335. For the sake of illustration, a second file system 330b is also shown in association with a second allocated sub-pool 340b and a second allocated non-SLAT VAS 355b. Notably, the second file system 330b is also a non-SLAT file system that, because of its a priori allocation, does not have access to resources of the first VCS 205a.

The top-level storage manager 310 can also allocate resources to a SLAT storage manager 320 as a SLAT sub-pool (shown as a third allocated sub-pool 340c). Embodiments may implement both the top-level storage manager 310 and the SLAT storage manager 320 as components or functional blocks of the management controller 150 of FIG. 1. The allocation and management of the SLAT sub-pool is represented by the dashed bi-directional arrow between the top-level storage manager and the third allocated sub-pool 340c.

In some embodiments, the SLAT sub-pool allocation represents a fixed portion (e.g., some or all) of resources from some or all of the various VSCs 205. For example, a portion of the resource pool 335 can be partitioned out or otherwise dedicated for use by the SLAT storage manager 320. In other embodiments, the top-level storage manager 310 allocates to the SLAT storage manager 320 all resources of the resource pool 335 not being used by non-SLAT file systems or for other uses (e.g., for file system snapshots, diagnostic purposes, etc.). For example, performance improvements of auto-tiering can often be maximized when maximum resource flexibility is provided to the auto-tiered file system. Because of the manner in which the SLAT sub-pool resources are managed, embodiments allow the top-level storage manager 310 to add resources to, or subtract resources from, the SLAT sub-pool allocation in a substantially transparent way.

From the perspective of the SLAT storage manager 320, allocation of the SLAT sub-pool by the top-level storage manager 310 results in a common SLAT address space 345. In some embodiments, the SLAT storage manager 320 is aware of the amount of resource capacity in its sub-pool that is associated with each VSC 205. However, rather than treating the common SLAT address space 345 as having fixed resources from those particular VSCs 205, the SLAT storage manager 320 can treat the common SLAT address space 345 as one, overall capacity that can be allocated. For example, the common SLAT address space 345 may be treated as an array of virtual block addresses that represent a storage capacity matching that of the common SLAT address space 345.

When allocating capacity to a SLAT file system, the SLAT storage manager 320 allocates a portion of the common SLAT address space 345. Unlike in the non-SLAT context, the SLAT file system allocations may be implemented without restriction to particular capacities of particular VSCs 205. For example, establishing SLAT file system 330c to have a particular maximum capacity can involve reserving a subset of virtual block addresses (VBAs) from the common SLAT address space 345 for use by the file system 330c, where the reserved subset represents the desired maximum capacity. The reserved VBAs can be considered an allocated SLAT virtual address space (VAS) 350, as shown.

Each VBA is configured to correspond to an LBA of the SLAT sub-pool (i.e., preferably, the number of VBAs in the common SLAT address space 345 is equal to the number of LBAs in the SLAT sub-pool). Mappings can be generated and maintained between the LBAs of data blocks in which file system 330 data is physically stored and the VBAs of the SLAT VAS 350 allocated to that file system 330. Some embodiments may generate an a priori set of mappings (e.g., before any data is stored in the file system), while other embodiments only generate mappings as data is stored.

According to some embodiments, the top-level storage manager 310 is configured to manage effectively at the LBA level, while the SLAT storage manager 320 is configured to manage at the VBA level. For example, promoting or demoting data in a non-SLAT file system (e.g., file system 330a) may involve moving the data from one data block to another data block. Notably, both the source and target LBAs were already allocated to that non-SLAT file system (e.g., as part of the a priori allocation), and the top-level storage manager 310 is configured to directly manage those respective LBAs. Promoting or demoting data in a SLAT file system (e.g., file system 330c), however, may involve moving the data from one data block to another data block, and updating the file system's mappings to point to the new location. In the SLAT context, the source and target LBAs were allocated to the SLAT sub-pool, but not specifically to the SLAT file system. Accordingly, the top-level storage manager 310 does not know what LBAs are invoked without going through the SLAT storage manager 320 to find the appropriate mappings. For example, if particular file system data is requested, the top-level storage manager 310 may only know that the file system is a SLAT file system, and any identification of the data would point to a VBA in the SLAT file system. The SLAT storage manager 320 would then consult its mappings to determine the LBA associated with the requested VBA at the time of the request, after which operations could be performed on the data stored at that LBA.

Figure 4:
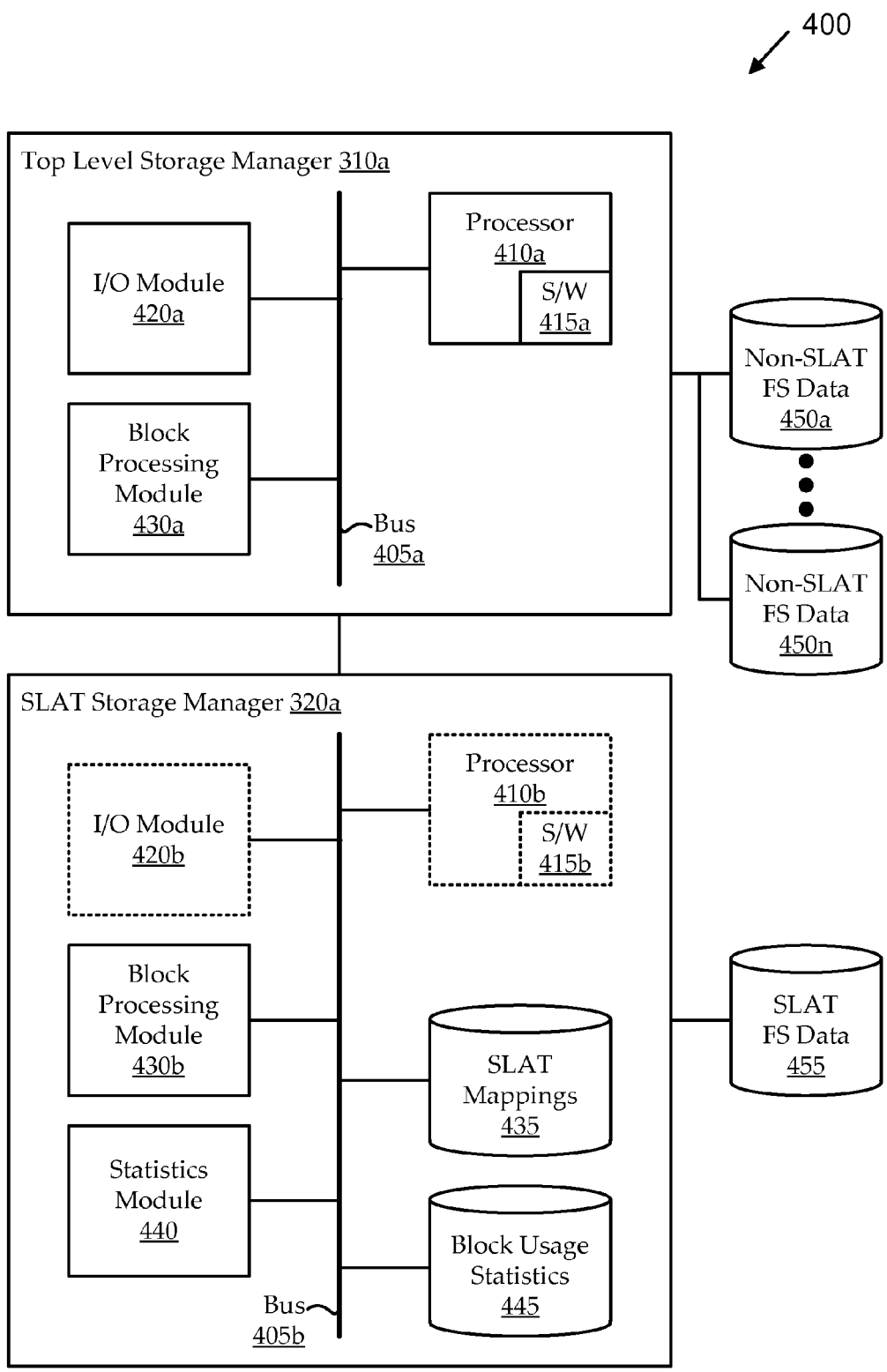
FIG. 4 shows another partial data storage system, having an illustrative top level storage manager and an illustrative SLAT storage manager, according to various embodiments.

FIG. 4 shows another partial data storage system 400, having an illustrative top level storage manager 310a and an illustrative SLAT storage manager 320a, according to various embodiments. In some embodiments, the top-level storage manager 310a and the SLAT storage manager 320a are implemented as part of the management controller 150 of FIG. 1. Embodiments are implemented in hardware and/or software, for example as part of a computational environment. Various functions are illustrated as functional blocks. Though the functional blocks are shown as hardware elements that may be electrically coupled via bus 405, some or all of the functional elements can alternatively be implemented as software modules. Further, though not shown, additional functionality may be included.

Turning first to the top-level storage manager 310a, embodiments include a processor 410a, which may be implemented as one or more central processing units (CPUs) or any other suitable processing function. Some implementations may further include processing acceleration unit, which can include a DSP, a special-purpose processor, and/or the like. In some implementations, the processor 410a is configured to perform functionality through software 415a. For example, software elements can be located within a working memory, including an operating system and/or other code, such as an application program. The software 415a may include instructions, which, when executed, cause the processor 410a to perform functionality, such as method steps of methods described herein.

Embodiments also include an input/output (I/O) module 420a for handling input and output commands relating to block operations and the like. For example read and write commands can be handled (e.g., interpreted, parsed, translated, etc.) by the I/O module 420a. Though not shown, embodiments of I/O module may be in communication with one or more input devices (e.g., a mouse, a keyboard, etc.) and/or one or more output devices (e.g., a display device, a printer, etc.).

Embodiments of the top-level storage manager 310a also include a block processing module 430a for handling block-level operations. The block processing module 430a can determine which LBAs are invoked by various operations and can manage the performance of those operations (e.g., by directing the SLAT storage manager 320a, one or more hosts 110 of FIG. 1, etc.). For example, a user may desire to write data to a particular file. The file write command may be interpreted by the I/O module 420a to generate a block-level command, which is sent to the block processing module 430a. The block processing module 430a can then perform (or direct performance of) the block level operations to cause the data to be written to a physical storage location associated with that file.

As discussed above with reference to FIG. 3, the top-level storage manager 310 may directly manage certain file systems (e.g., non-SLAT file systems). Accordingly, the top-level storage manager 310 may be in communication with one or more storage volumes (e.g., VLUNs) shown as non-SLAT file system data stores 450. Additionally, the top-level storage manager 310 may store other types of data for use in performing various functions, such as non-SLAT auto-tiering, diagnostics, etc. By way of example, the top-level storage manager 310 may be in communication with disk drives, optical storage devices, computer-readable storage media and/or readers, solid-state storage devices, such as a random access memory (RAM) and/or a read-only memory (ROM), which can be programmable, flash-updateable, and/or the like, etc. Various functionality may involve communications with other subsystems (e.g., hosts 110 of FIG. 1) or networks (e.g., LAN 135 of FIG. 1). Accordingly, though not shown, some embodiments include a communications system (e.g., a modem, a network card (wireless or wired), an infra-red communication device, etc.).

It should be appreciated that alternate embodiments of a computational environment 300 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 300 may include code for implementing embodiments of the present invention as described herein.

Turning to the SLAT storage manager 320a, functional blocks are shown for performing SLAT-related functionality. In some embodiments, the SLAT storage manager 320a exploits the I/O handling and processing functionality of the top-level storage manager 310a, and may not have its own I/O module 420a and/or block processing module 430a. Other embodiments of the SLAT storage manager 320a may have dedicated I/O modules 420a and/or block processing modules 430a. For example, this may provide certain desired redundancies, parallelism, or the like. Embodiments also include a block processing module 430b. Though the types of block operations and functional capabilities of the block processing module 430b may be similar to those of the block processing module 430a of the top-level storage manager 310a, the block processing module 430b of the SLAT storage manager 320a can also handle the abstraction of LBAs into VBAs. For example, as discussed above, the SLAT storage manager 320a maintains SLAT mappings 435 in a data store. In some implementations, the SLAT mappings 435 are kept as a separate VLUN with various types of data. For example, included in the SLAT mapping VLUN may be SLAT mapping statistics (as discussed below), a metadata version number, a timestamp of a last scan (e.g., number of seconds since UNIX epoch), a number of desired and priority transports, etc.

Performance of various SLAT operations involves a determination of when to promote or demote data. Embodiments of the SLAT storage manager 320a include a statistics module 440 for making these determinations by gathering and analyzing statistics 445 relating to data usage and the like. The statistics 445 may be stored in a data store. In some embodiments, the statistics 445 are used to determine whether. In other embodiments, the statistics 445 are used to determine whether blocks within a file system should be promoted or demoted with respect to other data in any files systems sharing the common SLAT sub-pool of resources.

It will be appreciated that different types of statistics 445 can be maintained to provide different types of functionality. In one illustrative embodiment, statistics are kept for each data block, and may be stored along with the respective SLAT mappings 435 for the blocks. The basic set of statistics 445 can contain a count and a running rate. On each I/O access of a data block, the count is incremented (e.g., but not allowed to roll over). The count can be used to calculate a current rate. In some implementations, rather than storing the current rate, the current rate is combined with a running rate, resulting in a new running rate, which can be stored. The count can be set to zero when the running rate is updated. Some implementations maintain separate read and write statistics and separate random and sequential statistics for each set of statistics 445. Classification as random or sequential may rely on sequential access detection algorithms. In certain implementations, a daily set and a weekly set of statistics 445 are maintained. The statistics 445 may be kept with the LBA of the block, the storage class where the block is stored, the desired tier and transporter priority, one or more flags (e.g., a "valid" flag, a "lost map" flag, etc.), etc. Statistics 445 can also be maintained for the SLAT mappings 435. In some implementations, SLAT mapping statistics are not updated on a per IO basis, but rather are summarized from the block access statistics. These can include IO counts and rates for exported VLUNs, average rates for accessed blocks, etc., and they can be updates daily, weekly, or at any other useful frequency.

It will be appreciated that the systems described with reference to FIGS. 1-4 are only illustrative embodiments, and that modifications are possible without departing from the scope of the invention. Further, the systems above can be used to perform various types of functionality, including functions described with reference to methods herein. Similarly, various methods described herein may be performed using system embodiments other than those described above. References to system components in the context of method embodiments are, therefore, intended only to add clarity and should not be construed as limiting the scope of those embodiments.

Figure 5:
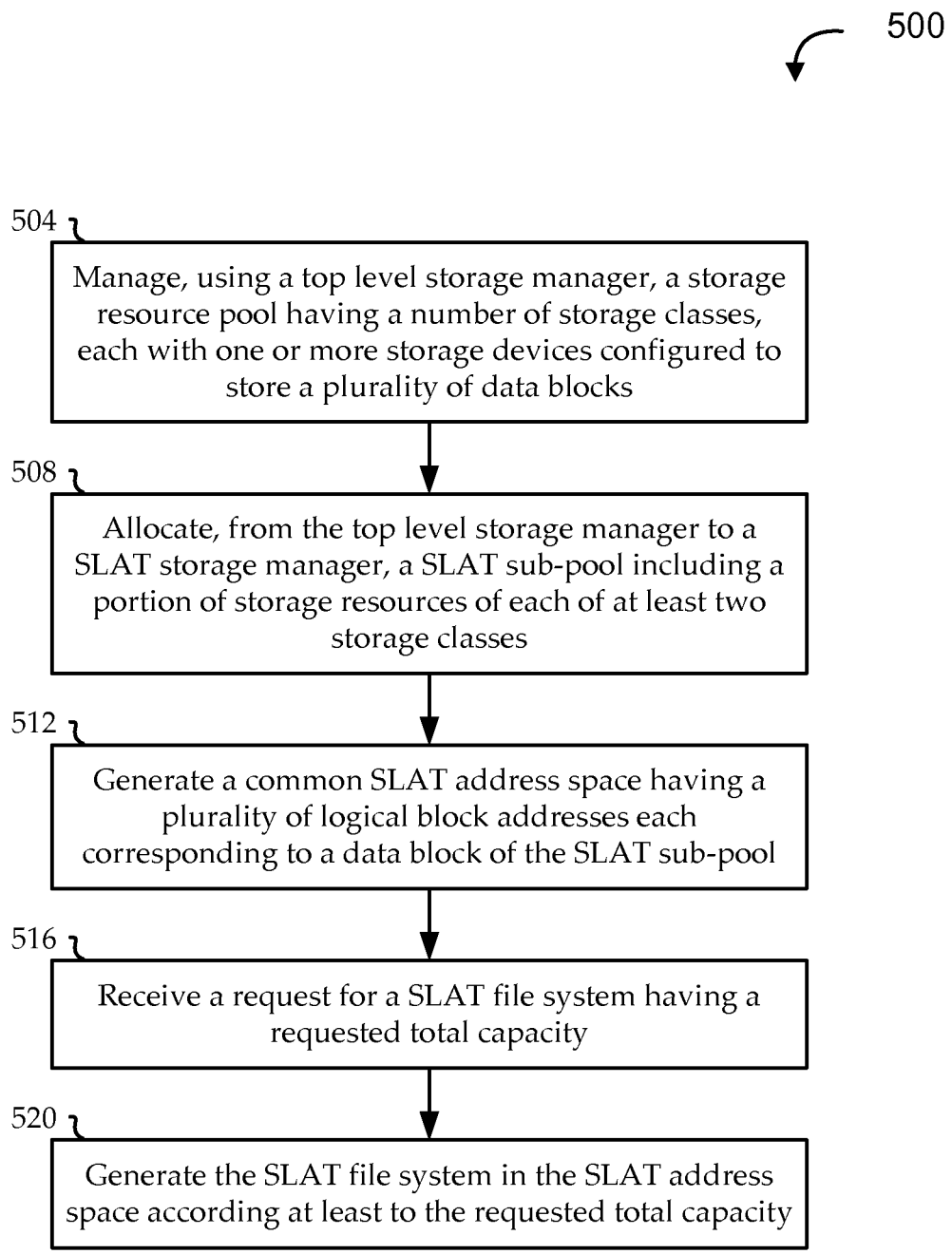
FIG. 5 shows a flow diagram of an illustrative method for generating SLAT file system, according to various embodiments.

Turning to FIG. 5, a flow diagram is shown of an illustrative method 500 for generating a SLAT file system, according to various embodiments. Embodiments begin at stage 504 by managing, using a top-level storage manager, a storage resource pool having a number of storage classes, each with one or more storage devices configured to store a plurality of data blocks. At stage 508, the top level storage manager allocates to a SLAT storage manager a SLAT sub-pool including a portion of storage resources of each of at least two storage classes. For example, some implementations may allocate all storage resources to the SLAT sub-pool, while other implementations may reserve or take back storage resources for use with non-SLAT file systems. In either case, it is desirable to allocate resources to the SLAT sub-pool from at least two of the storage classes, so that auto-tiering functions can be used.

At stage 512, a common SLAT address space is generated to have a plurality of logical block addresses each corresponding to a data block of the SLAT sub-pool. As described above, the SLAT address space is effectively a common pool of resources that is usable by all SLAT file systems. For example, this allows one file system's data to be promoted or demoted with respect to another file system's data without restriction from an a priori allocation of specific resource classes to specific SLAT file systems.

A request is received at stage 516 to generate a new SLAT file system of a requested total capacity. For example, if the total SLAT sub-pool has one terabyte of storage resources from a number of storage devices in a number of storage classes, a new SLAT file system may be requested to have a maximum capacity of one terabyte or less of storage capacity. At stage 520, the SLAT file system is generated in the SLAT address space according at least to the requested total capacity. Various techniques are possible for generating the SLAT address space for the file system, including those described with reference to FIGS. 6A and 6B, below.

Figure 6A:
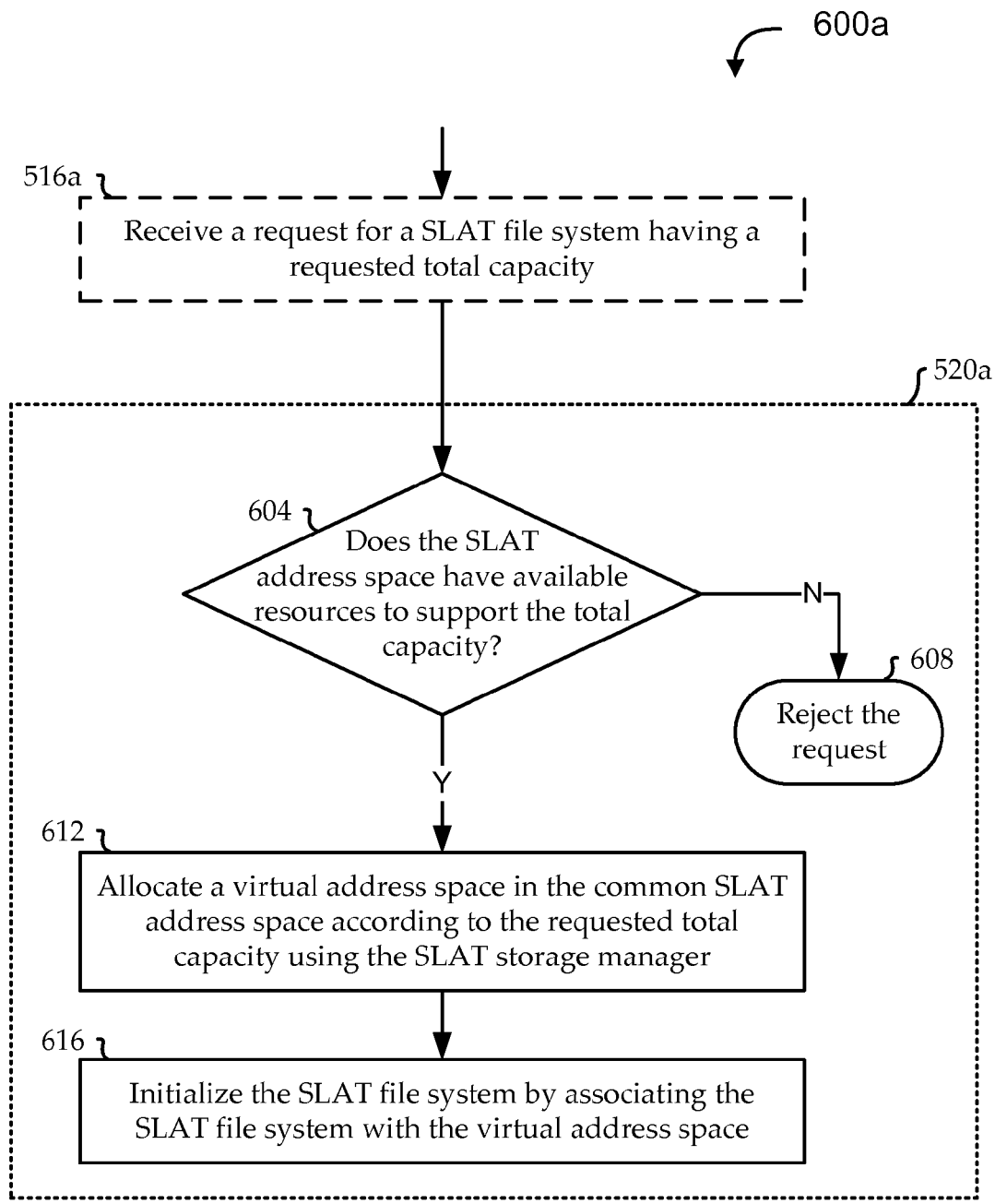
FIGS. 6A and 6B show flow diagrams of illustrative methods for initializing SLAT file systems, according to various embodiments.
Figure 6B:
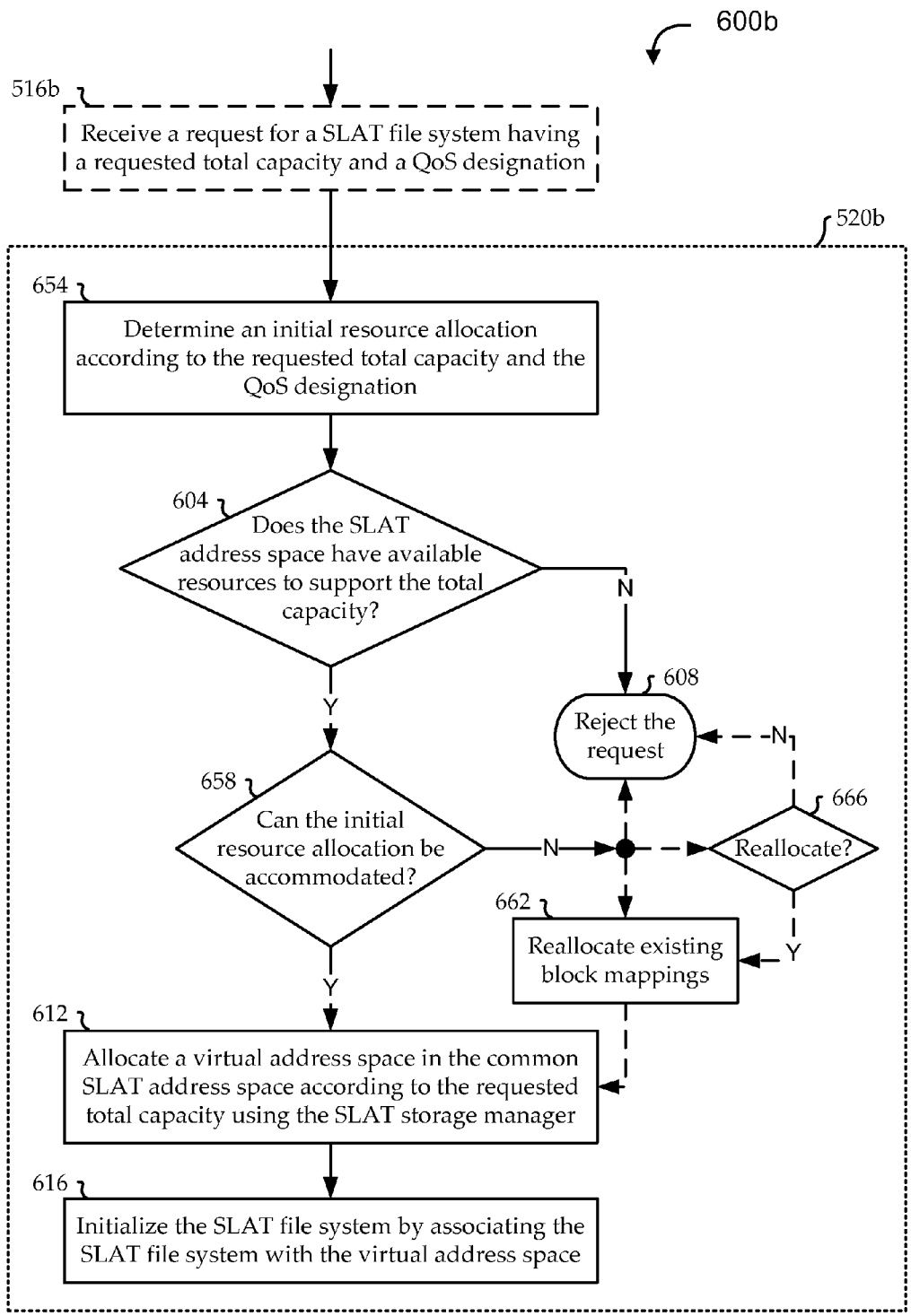

FIGS. 6A and 6B show flow diagrams of illustrative methods 600 for initializing SLAT file systems, according to various embodiments. Turning first to FIG. 6A, embodiments of a method 600a are shown in context of stages 516a and 520a corresponding to stages 516 and 520 of FIG. 5. The method 600a begins at stage 516a when a request is received for a SLAT file system having a requested total capacity. Stages 604-616 provide an illustrative method for generating the SLAT file system in the SLAT address space according at least to the requested total capacity.

At stage 604, a determination is made as to whether the SLAT address space has available resources to support the total capacity. As discussed above, the SLAT address space is a common address space used by all the SLAT file systems. While each SLAT file system may have an allocated maximum, the SLAT file systems do not have allocations of fixed data blocks; rather the blocks are allocated as part of the allocated capacity through mappings (i.e., from VBAs to LBAs) so that data blocks can be dynamically allocated to any SLAT file system from across the entire SLAT sub-pool. Accordingly, at stage 604, the determination is not whether specific blocks are available in specific storage classes (e.g., capacity within specific portions of the SLAT sub-pool), but whether capacity is available within the unallocated portion of the SLAT address space.

In some implementations, a "sparse LUN" architecture can be used, in which a user chooses how much of the file system (or LUN) to allocate at creation time. The allocation can range from nothing (e.g., zero bytes) to everything (e.g., the full space of the LUN). For example, a user creates a SLAT file system that is two Terabytes, but only wants to use 500-Megabytes at the time the file system is created. Techniques described herein allow the SLAT file system to be created in such a way that the full two Terabytes are "reserved" as the SLAT address space within the SLAT sub-pool (e.g., without any mappings to allocated sub-pool resources), and 500-Megabytes are actually allocated as part of the address space (e.g., SLAT mappings are generated for 500-Megabytes of data blocks).

If there is not sufficient capacity for the SLAT file system, the request is rejected at stage 608. In some embodiments, at stage 608, an error message is returned to a requesting user indicating the insufficiency of capacity. In other embodiments, the requesting user is provided an opportunity to adjust the request, for example, by reducing the requested capacity. In one implementation, a suggestion is provided as to an amount of available capacity to use instead. In still other embodiments, the requesting user is provided an opportunity to adjust system parameters, for example, by adding storage resources to the SLAT sub-pool (typically, to the storage system for allocation to the SLAT sub-pool). In one implementation, a recommendation is generated and supplied to the user as to the types of resources that would be most optimal to add, for example, as a function of current resource usage, usage trends or statistics, apparent cost of storage, desired QoS requirements of the new file system, etc.

If adequate capacity is available for the SLAT file system according to the determination of stage 604, the SLAT storage manager allocates a virtual address space in the common SLAT address space at stage 612, according to the requested total capacity. In some embodiments, the allocation is an array of VBAs corresponding to an amount of capacity that is substantially the requested total capacity. The array of VBAs may or may not be sequential. In some implementations, the array of VBAs is determined according to which addresses are available, for example, by using space map blocks, versioning, sequential numbering, flags, or any other useful technique.

At stage 616, the requested SLAT file system is initialized by associating the SLAT file system (e.g., an index or name) with the virtual address space. The file system is requested before data is stored thereto. As such, the file system is typically initialized as the set of VBAs with no associated data. In some embodiments, the VBAs are generated (or associated) without any mappings, and the mappings are only created and adjusted as input/output operations occur (e.g., data is stored, deleted, manually or automatically promoted or demoted, etc.). In other embodiments, some or all of the VBAs may be associated with an a priori mapping, which is adjusted as input/output operations are executed.

Turning to FIG. 6B, embodiments of another method 600b are shown in context of stages 516b and 520b corresponding again to stages 516 and 520 of FIG. 5. The method 600b begins at stage 516b when a request is received for a SLAT file system having a requested total capacity and an initial QoS designation. In some implementations, the initial QoS designation is an indication of an expected usage paradigm (e.g., "write optimized," "read optimized," "sequential access," "non-sequential access," etc.). In other implementations, the initial QoS designation is a set of best practices (e.g., a protocol established to guide an a prior and/or continuing allocation paradigm for file system data). In still other embodiments, the initial QoS designation is a desired a priori allocation of resources from specific storage classes (e.g., by percentage of the file system, number of bytes, or the like). In this context, stages 604-666 provide an illustrative method for generating the SLAT file system in the SLAT address space according at least to the requested total capacity and QoS designation.

At stage 654, embodiments determine an initial resource allocation according to the requested total capacity and the QoS designation. Depending on the type of QoS designation, the determination may be performed differently. For example, if an explicit a prior allocation is requested, embodiments attempt to fulfill that explicit request. Alternatively, if the request is more implicit (e.g., as an indication of an expected usage paradigm), embodiments use one or more techniques to for an initial allocation. Some implementations may set the initial allocation as belonging to a single storage class (e.g., highest cost storage, archive storage, etc.). For example, the initial allocation may involve mapping VBAs to any remaining blocks of the highest storage class, then to any remaining blocks of the next storage class, and so on. Other implementations use templates for allocations. For example, the template may use various parameters and weightings to determine appropriate storage class, RAID level, etc. It is worth noting that these allocations may only involve attempting to generate initial mappings between VBAs of the requested file system and empty or proposed LBAs of the SLAT sub-pool.

Embodiments continue, as in the method 600*a* of FIG. 6*a*, at stage 604, by determining whether the SLAT address space has available resources to support the total capacity. As discussed above, this determination is made with respect to the total capacity of the SLAT address space, and not according to specific storage classes within the sub-pool (i.e., not according to the QoS designation). If there is not sufficient capacity for the SLAT file system, the request is rejected at stage 608.

At stage 658, a further determination is made as to whether the initial allocation can be accommodated. For example, the initial resource allocation determined in stage 654 may be based on the provided QoS designation. This QoS designation may indicate an initial condition in which the user would like to see the file system data stored prior to any auto-tiering or other operations. As such, it may be desirable at stage 658 to determine whether this desired initial allocation is possible. If the proposed initial allocation is not possible, a few options may be possible according to various embodiments. In some embodiments, the request is rejected at stage 608. In other embodiments, any existing block mappings (e.g., associated with other file systems) are reallocated (e.g., moved) at stage 662 to accommodate the proposed allocation, if possible. In still other embodiments, a determination is made at stage 666 as to whether a reallocation should be attempted, for example, by prompting a user and awaiting a response. If the reallocation is desired, it may be performed at stage 662; and if the reallocation is not desired, the request may be rejected at stage 608.

In the event that the proposed allocation can be accommodated according to the determination at stage 658, or a reallocation is successful at stage 662, the method 600*b* may proceed substantially as in FIG. 6A. At stage 612, the SLAT storage manager allocates a virtual address space in the common SLAT address space, according to the requested total capacity (e.g., and possibly also according to the proposed initial resource allocation). At stage 616, the requested SLAT file system is initialized by associating the SLAT file system with the virtual address space.

Figure 7:
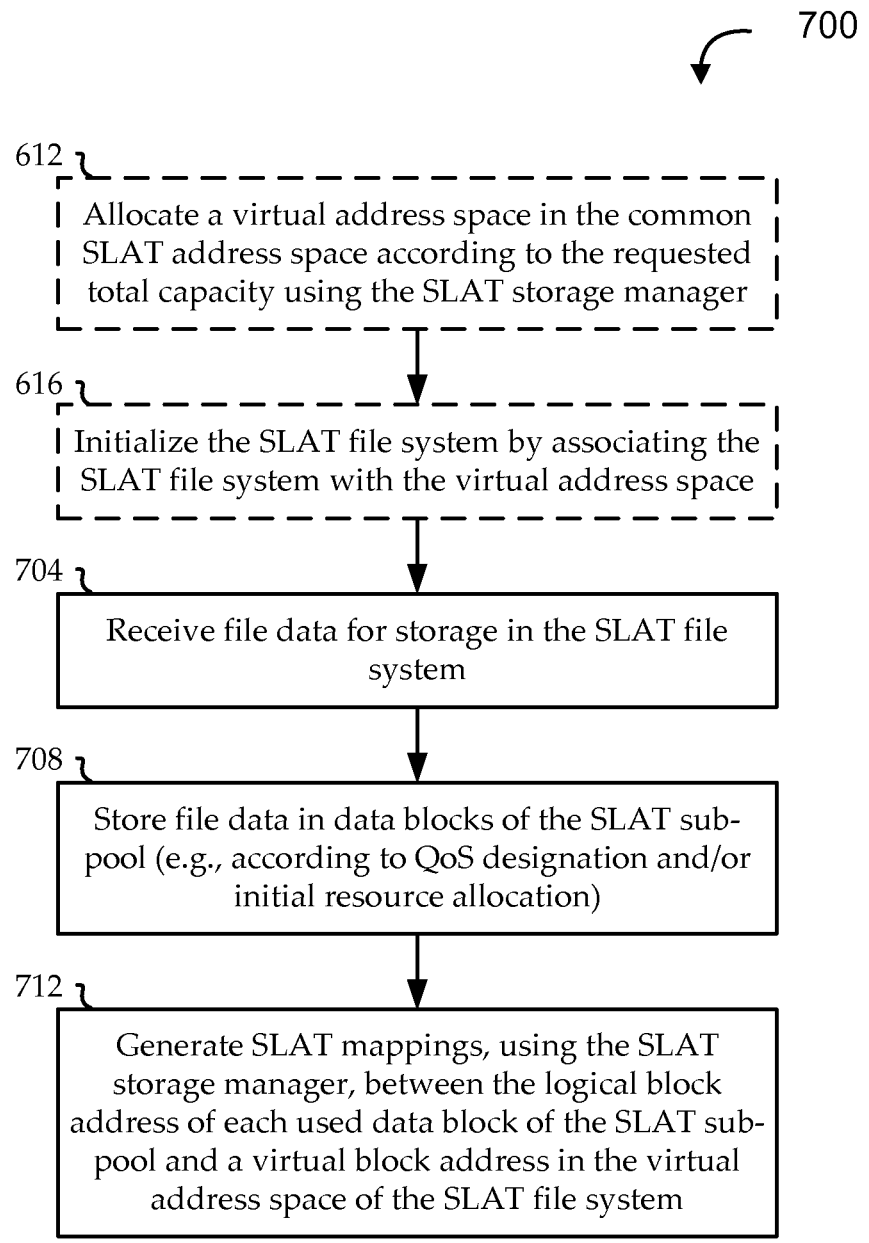
FIG. 7 shows a flow diagram of an illustrative method for storing data to a SLAT file system, according to various embodiments.

FIG. 7 shows a flow diagram of an illustrative method 700 for storing data to a SLAT file system, according to various embodiments. Subsequent to initializing a SLAT file system (e.g., according to FIG. 5, 6A, or 6B), data is stored thereto. For the sake of context, the method 700 is shown in context of stages 612 and 616 of FIG. 6A or 6B. For example, the SLAT storage manager allocates a virtual address space in the common SLAT address space at stage 612, and the requested SLAT file system is initialized by associating the SLAT file system with the virtual address space at stage 616.

Embodiments begin at stage 704 by receiving file data for storage in the SLAT file system. The file system may be created for a particular application or application suite, and the file data may be application data and/or data stored for use with the application. In one example, the file data includes an email application, email index files, email files, attachment files, etc. In another example, the file data is a flat-file or relational database.

The received data is stored in data blocks of the SLAT sub-pool at stage 708. As discussed above, the SLAT-sub-pool includes data blocks of the physical storage devices that are allocated to the SLAT storage manager. The data blocks may be a standard blocks size, or the block size may be determined to provide optimal auto-tiering support. For example, it may be desirable to decrease block sizes to increase the fidelity at which auto-tiering opportunities can be identified and implemented (e.g., smaller block sizes can provide a finer granularity of promotion and demotion of data). At the same time, however, making auto-tiering decisions may involve maintaining statistics on each data block, so that more statistics (and, therefore, more storage overhead for statistics) would be needed for larger numbers of data blocks. As such, block size may be chosen at least in part to balance fidelity against overhead. As the data is received, it may be stored in data blocks according to various schemes. In some embodiments, the data is stored to randomly or sequentially available data blocks in the SLAT sub-pool. In other embodiments, the data is stored in a particular storage class by default (e.g., any available blocks of the highest storage class, followed by any available blocks of the next-highest storage class, and so on). In still other embodiments, data is stored in data blocks according to QoS designation and/or initial resource allocation. For example, the initial resource allocation determined in stage 654 of FIG. 6B can be used, or a similar technique can be employed as part of stage 708 to determine a resource allocation at the time of storage.

As discussed above, SLAT file systems are not directly associated with physical resource allocations. Rather, the SLAT manager allocates a virtual address space in the common SLAT address space (e.g., according to stage 612), and that allocated virtual address space corresponds to physical storage locations through dynamic mappings. Accordingly, at stage 712, SLAT mappings are generated using the SLAT storage manager between the LBA of each used data block of the SLAT sub-pool and a VBA in the virtual address space of the SLAT file system. The mappings may be generated in any useful way, for example, as data is stored, after data is stored, as an adjustment to previously generated mappings, etc. It is worth noting that in some implementations, the mappings are generated prior to storing the data (i.e., stage 712 may be performed before stage 708).

For the sake of illustration, suppose a storage system includes three storage classes ("high," "medium," and "low"), each having one gigabyte of storage resources, and all three gigabytes of system resources are allocated to the SLAT storage manager. The resources are divided evenly into 999,999 data blocks of one kilobyte each (e.g., the "high" storage class is represented by blocks 00000h to 51614h; the "medium" storage class is represented by blocks 51615h to A2C29h; and the "low" storage class is represented by blocks A2C2Ah to F423Fh). The first SLAT file system may be requested to have a capacity of one megabyte, or one thousand, one-kilobyte data blocks (e.g., blocks 00000 to 003E8). For example, a mapping of "FS_BLOCK 00032h=>SP_BLOCK 51615h" may indicate that the fiftieth block of file data for the SLAT file system ("block 32h") is stored to the first data block of the "medium" storage class ("block 51615h").

As discussed above, once the data is stored in data blocks, various input/output operations, auto-tiering operations, and/or other operations may occur. These operations may cause data to be moved to different data blocks, for example, to promote or demote the data. In the SLAT file system context, these changes may result from statistical analyses of data usage, and changes in physical data locations are managed by maintaining updated mapping information.

Figure 8:
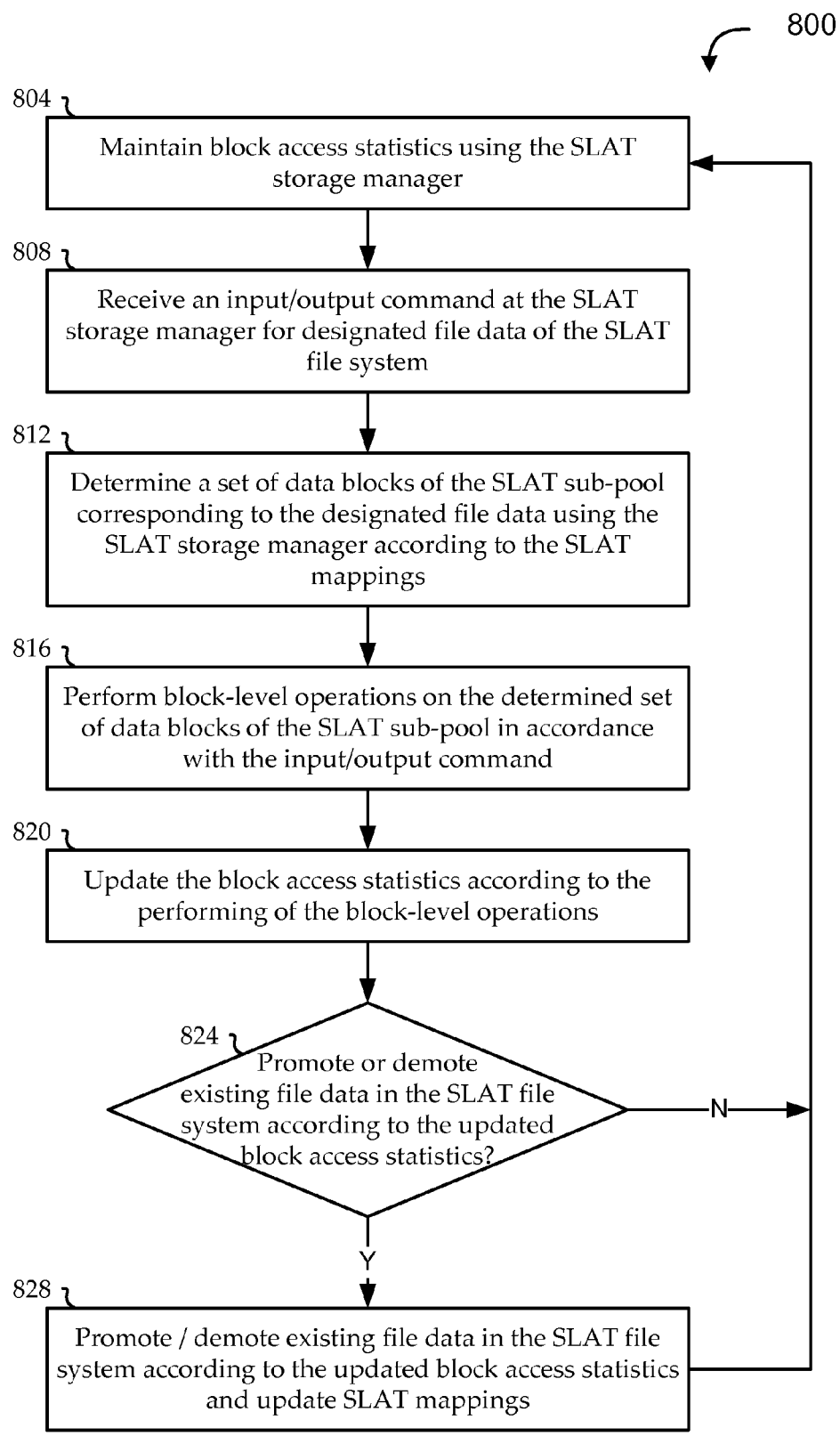
FIG. 8 shows a flow diagram of an illustrative method for handling certain block-level operations in a SLAT file system, according to various embodiments.

FIG. 8 shows a flow diagram of an illustrative method 800 for handling certain block-level operations in a SLAT file system, according to various embodiments. As discussed above, various functions, including auto-tiering functions, are facilitated by maintaining and analyzing statistics, for example, at the block level. Stage 804 includes the maintaining of block access statistics using the SLAT storage manager. It will be appreciated that, in some embodiments, stage 804 is implemented substantially as a background process that runs continuously or periodically in parallel with the other stages. Statistics maintained at stage 804 may include any useful block access statistics, including, for example, how often a particular block is accessed, what type of access occurred (e.g., what type of input and/or output operations invoked the data block, in what ways the block was affected by the access), when the last access of the block occurred, etc. The block access statistics may also be maintained in any useful way. In some embodiments, all the block access statistics are maintained in a single data storage location that is accessible to the SLAT storage manager. In other embodiments, more recent or more active block access statistics are maintained in one storage location, while less recent or less active block access statistics are offloaded to another storage location.

At stage 808, an input/output command is received at the SLAT storage manager for designated file data of the SLAT file system. The input/output command may be any command that accesses and/or affects data in a data block. For example, the input/output command may involve adding, deleting, changing, or accessing data in a data block. In the context of SLAT file systems, the file data may be abstracted from its corresponding stored data via a virtual block address and a logical block address. At stage 812, a set of data blocks of the SLAT sub-pool is determined that corresponds to the designated file data using the SLAT storage manager according to the SLAT mappings. For example, the designated file data may point directly to one or more virtual block addresses in the SLAT file system's virtual address space. The SLAT storage manager consults its maintained mappings to determine which logical block addresses correspond to the virtual block addresses of the designated file data. The determined logical block addresses further correspond to the data blocks at which the designated file data is physically stored.

Once the set of data blocks corresponding to the designated file data is determined, those blocks can be used in the desired operations. At stage 816, block-level operations are performed on the determined set of data blocks of the SLAT sub-pool in accordance with the input/output command. For example, the data in those blocks may be changed, deleted, etc. The block access statistics maintained in stage 804 are updated at stage 820 according to the performing of the block-level operations. For example, the block access statistics are updated to reflect that the set of one or more data blocks has been accessed as part of the operation.

At stage 524, a determination is made (e.g., by the SLAT storage manager) as to whether to promote or demote existing file data in the SLAT file system according to the updated block access statistics. In some embodiments, file data can be automatically demoted for a lack of access. For example, if a file system is created and data is stored thereto, and the file system is left alone without any interaction for some time, its data will eventually be demoted for lack of use. In other embodiments, file data is only promoted or demoted when necessary. In certain implementations, file data is promoted when its access frequency rises above a certain threshold or certain access patterns are detected, and file data is demoted when its access frequency falls below a certain threshold or certain other access patterns are detected. For example, promotion or demotion may result in the types of users accessing the data or the types of uses invoking the data (e.g., critical users or uses may be more heavily weighted). Notably, in a SLAT environment, one file system's data can be affected by another file system's data.

Because the full SLAT sub-pool resources are common to all the SLAT file systems, situations can arise in which one file system's data must be demoted to make room for promoting another file system's data. In these instances, conflict resolution techniques are applied (e.g., according to analysis of relevant statistics and/or QoS designations, etc.) to determine whether or not one file system's data should "win" over another file system's data. It is worth noting that the same scenario can potentially occur at any level of promotion or demotion. For example, demoting data of one file system may require promoting or further demoting other data of that file system or other data of another file system. In this way, embodiments of the SLAT storage manager can be implemented to manage all the data of all the file systems (e.g., to assess all the respective block level statistics) as a single set of data for purposes of promotion and/or demotion.

In some embodiments, additional limitations are applied (e.g., by default, by template according to QoS designation, manually by a system administration, etc.) as to when and/or how data can be promoted or demoted. While it may be preferred in most cases to give the SLAT storage manager as much control as possible over auto-tiering decisions and resources, it may be desirable in certain cases to limit the SLAT storage manager's freedom to make those decisions. For example, for certain file systems, a system administrator may only allow the data to be auto-tiered within certain LUNs or VLUNs, within certain storage classes, etc. In certain of those cases, the SLAT storage manager tries to promote or demote the data and only then encounters the restriction preventing execution of that decision. In others of those cases, the SLAT manager only allocates "allowed" portions of the SLAT sub-pool or only allows mapping to be generated to a subset of the LBAs in the sub-pool.

If it is determined at stage 824 to promote or demote the existing file data in that or another file system, the data is promoted or demoted accordingly at stage 828. As discussed above, promoting or demoting the data may involve updating the relevant mappings between VBAs and LBAs. Regardless of whether the data is promoted or demoted, embodiments may return to stage 804 to continue maintaining the block access statistics. Depending on the types of statistics being maintained, the statistics may be updated accordingly.

In some instances, it is desirable to promote and demote according to different considerations, for example, according to different periods. As described herein, embodiments of sub-LUN auto-tiering can seek to automatically optimize placement of data across multiple storage tiers. According to some embodiments, for each piece of data (e.g., each data block), two sets of statistics are maintained. For example, some implementations of stage 820 update the two sets of block access statistics according to the performing of the block-level operations. A first set of statistics can correspond to promotion considerations, and a second set of statistics can correspond to demotion considerations. For example, each set of statistics includes both read and write reference counters that are incremented on every non-sequential access. In such implementations, the two sets of statistics can be separate sets of statistics or can be derived from a single set of statistics. The sets of statistics can effectively correspond to different periods (e.g., a promotion period and a demotion period). In one implementation, the two periods are called the "scan delay" (corresponding to the promotion period) and the "hold multiple" (corresponding to the demotion period).

In some implementations, the two different sets of statistics (e.g., and correspondingly, the two periods) can be configured to promote quickly and demote slowly. According to such implementations, the first period, the scan delay, can determine if the data should be promoted to more expensive storage based on a high reference count; and the second period, the hold multiple, can be a multiple of the first period and can determine if data should be demoted to less expensive storage based on a low reference count for multiple periods. Such implementations can react quickly to so-called "hot" data by quickly promoting data that is being accessed frequently, while avoiding demoting other data too quickly. For example, it may be desirable to maintain a nightly task in higher-tier (faster) storage to ensure that the task runs in a short period of time overnight, even though the task is not accessed at all during the day (i.e., which would tend to cause associated data for that task to be demoted throughout the day). Avoiding demoting data too quickly (e.g., for data that became inactive only for a relatively short time) can reduce performance penalties that can be incurred when the data becomes active again.

Another approach for promoting and demoting differently can consider quality of service (QoS) scaling. Some auto-tiering implementations permit different file systems and/or portions of file systems to have different associated QoS. For example, it may be desirable for multiple LUNs sharing a common storage pool to all participate in the sub-LUN auto-tiering functionality, while still maintaining differentiation between the LUNs (e.g., when the LUNs are associated with different users, different tenants, etc.). Some LUN owners may have purchased and/or may demand a higher QoS, a system administrator for a set of LUNs may have assigned a different QoS to each of the different LUNs, etc.

In such environments, QOS parameters can be used to appropriately scale statistics (reference counts) for promotion and/or demotion operations being performed on the LUNs. For example, some implementations of stage 820 scale the block access statistics as they are being collected and/or subsequent to collection using a scaling factor derived from the assigned QoS parameters. For the sake of illustration, reference counts for all archive-priority volumes can be multiplied by 50%; reference counts for all low-priority volumes can be multiplied by 80%; reference counts for all medium-priority volumes can remain unchanged (e.g., multiplied by 100%, left alone, etc.); reference counts for all high-priority volumes can be multiplied by 120%; and reference counts for all premium-priority volumes can be multiplied by 150%. Such an implementation would effectively force an archive-priority volume to perform fifty percent more file access requests than a medium-priority volume to achieve the same data placement; and would effectively force a medium-priority volume to perform twice the file access requests as a premium-priority volume to achieve the same data placement. This results in higher priority volumes claiming a greater percentage of higher performing (typically faster and more expensive) resources as compared to lower priority volumes without completely excluding lower priority volumes from using those resources (e.g., if those lower priority volumes are receiving a disproportionately large number of file access requests).

Various implementations can use any suitable scaling factors for any suitable number of QoS levels. For example, some implementations can scale only according to two QoS levels (e.g., archive priority is scaled down, while all other priorities are left unaffected). Further, implementations can scale in any suitable manner. For example, some implementations can scale the statistic associated with each file access request, while others can scale at a macro level for an entire application, LUN, etc. as part of the promotion or demotion routine. Certain implementations scale only for promotion or demotion, while others scale for both. Similarly, some implementations can combine QoS scaling with separate promotion and demotion periods, as described above.

Some embodiments use such techniques to help ensure that tiering is optimal, including that highest priority and/or otherwise most important data is in the highest performing storage. However, it can also be desirable to ensure that some such storage is left available for promotion of other deserving data. Accordingly, some implementations seek to maintain a cushion of storage at some or all tiers. For example, one implementation seeks to leave approximately ten percent of each storage tier available for promotion and/or demotion purposes. During or after running of promotion and/or demotion routines, storage volumes can be evaluated to determine if the desired amount of cushion is present, and various techniques can be used to respond to insufficient cushion space (e.g., the next promotion/demotion routine can account for such a determination).

Figure 9:
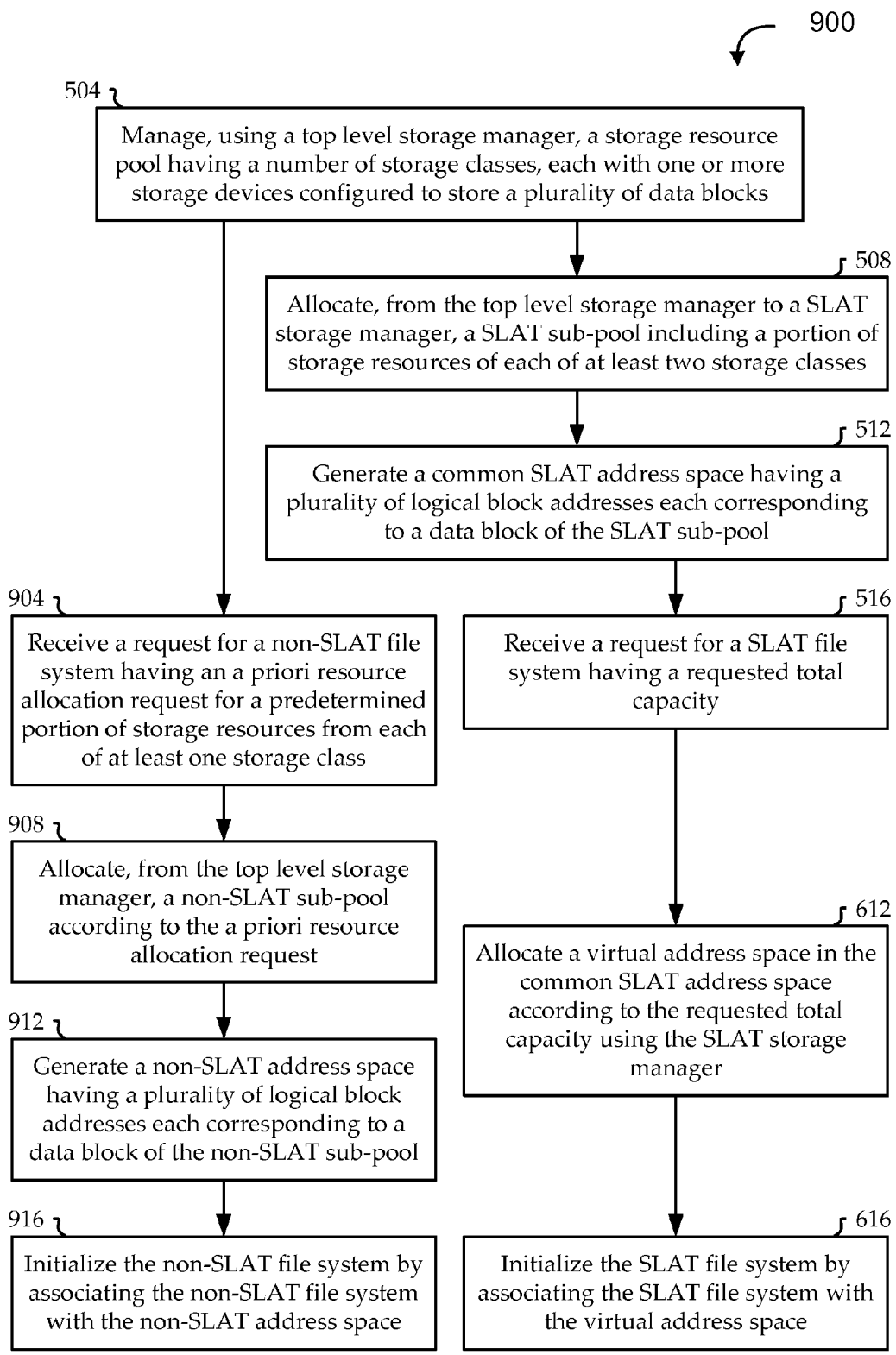
FIG. 9 shows a flow diagram of an illustrative method for managing a data storage system having both SLAT and non-SLAT file systems, according to various embodiments.

While the above methods focus on techniques surrounding SLAT functionality and SLAT file systems, techniques allow for simultaneous management of SLAT and non-SLAT file systems on a single storage system. FIG. 9 shows a flow diagram of an illustrative method 900 for managing a data storage system having both SLAT and non-SLAT file systems, according to various embodiments. One illustrative system that could be generated according to embodiments of the method 900 is discussed with reference to FIG. 3.

For the sake of context and clarity, generation of the SLAT file system is described according to stages of methods 500 and 600, as discussed above with reference to FIGS. 5, 6A, and 6B. Embodiments begin at stage 504 by managing, using a top level storage manager, a storage resource pool having a number of storage classes, each with one or more storage devices configured to store a plurality of data blocks. A SLAT sub-pool is allocated at stage 508 from the top level storage manager to a SLAT storage manager, including a portion of storage resources of each of at least two storage classes. At stage 512, a common SLAT address space is generated having a plurality of logical block addresses each corresponding to a data block of the SLAT sub-pool. At stage 516, a request is received for a SLAT file system having a requested total capacity. A virtual address space is allocated in the common SLAT address space according to the requested total capacity using the SLAT storage manager at stage 612, and the SLAT file system is initialized at stage 616 by associating the SLAT file system with the virtual address space.

At some time, before or after generation of the SLAT file system at stages 516, 612, and 616, a request is received at stage 904 for a non-SLAT file system having an a priori resource allocation request for a predetermined portion of storage resources from each of at least one storage class. At stage 908, a non-SLAT sub-pool is allocated from the top level storage manager according to the a priori resource allocation request. In some embodiments, a portion of system resources is reserved for non-SLAT file systems. For example, when resources are allocated to the SLAT storage manager in stage 508, only a portion of resources are allocated, and another portion is reserved. In other embodiments, all resources are allocated, by default, to the SLAT storage manager, but are reclaimed by the top-level storage manager for use by non-SLAT file systems when needed. Reclaiming the resources may involve various techniques for moving file data (e.g., promoting or demoting data) to free up the resources requested for use by the non-SLAT file systems. In certain of these embodiments, constraints involving available resources and priorities of existing data in SLAT file systems may cause certain types of requests for non-SLAT resources to be denied.

At stage 908, a non-SLAT address space is generated to have a number of logical block addresses each corresponding to a data block of the non-SLAT sub-pool. The non-SLAT file system is initialized at stage 916 by associating the non-SLAT file system with the non-SLAT address space. The non-SLAT address space is managed directly by the top-level manager, which has direct knowledge of the LBAs without abstracting the addresses through mappings. Notably, when creating a file system for an application having a specific set of associated best practices for a priori data tiering, it may be undesirable to add the overhead of SLAT (or possibly any auto-tiering) techniques. For example, more efficiency may be achieved in some cases by allowing input/output requests to be handled without the added overhead of translating VBAs to LBAs via their respective mappings.

It is worth noting that, according to these techniques, various types of file systems can be generated and any of the types can coexist in a storage environment. For example, as discussed with reference to FIGS. 3 and 9, multiple SLAT and non-SLAT file systems can coexist in a resource pool. Further, the non-SLAT file systems can include file systems that have no tiering applied, file systems that have manual data tiering applied (e.g., data stored in different storage classes, but in substantially fixed LUNs), file systems that have traditional auto-tiering techniques applied (e.g., data stored in fixed, a priori allocations), etc.

It is noted that, while many embodiments are described herein with reference to "normal" (e.g., decompressed, active) file system data, other types of data can be stored in the various storage tiers. For example, a tier of storage used in auto-tiering implementations can include compressed data, de-duplicated data, etc. Data de-duplication can involve mapping multiple virtual blocks of identical data to a single physical copy. Data compression can involve allocating and tracking variable-sized blocks of data in a storage pool. In some implementations, data compression can benefit from overlaying new write data on top of compressed blocks, deferring the collapse of the new data into the compressed. Compression and de-duplication each have associated cost and access speed, and such functions can be provided as part of a storage device. Alternately, compression and de-duplication functionality can be provided in a storage system in conjunction with typical storage devices.

It is further noted that, the various tiers of storage in a resource pool may or may not be collocated. In some implementations, one or more storage devices can be located at one or more remote locations from the storage system. For example, cloud storage can be provided as a tier of the multi-tier storage resource pool. In some implementations, cloud storage can be used in conjunction with compression and/or de-duplication.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for auto-tiering in a storage resource pool having a number of storage classes, each with one or more storage devices configured to store a plurality of data blocks, the method comprising:
    updating sets of block access statistics maintained by a storage manager of a sub-LUN auto-tiering (SLAT) file system in response to performing one or more block-level operations on one or more data blocks of the SLAT file system, the sets of block access statistics comprising read and/or write reference counters that are incremented on each non-sequential access of a corresponding data block of the SLAT file system, the SLAT file system being implemented in a virtual address space mapped by the storage manager to one or more of a plurality of logical block addresses, each corresponding to a data block of a SLAT sub-pool that includes a portion of storage resources of each of at least two storage classes, the one or more data blocks being of a first storage class;
    determining to promote file data stored in the one or more data blocks when the sets of updated block access statistics indicate greater than a threshold count of the reference counters for the one or more data blocks over an adjustable promotion period;
    determining to demote the file data when the sets of updated block access statistics indicate less than a threshold count of the reference counters for the one or more data blocks over a demotion period defined as a multiple of the promotion period,
    moving the file data to data blocks of a second storage class when it is determined to promote the file data; and
    moving the file data to data blocks of a third storage class when it is determined to demote the file data.

2. The method of claim 1, wherein one of the first or second set of block access statistics is derived from the other of the first or second set of block access statistics.

3. The method of claim 1, further comprising:
    receiving an input/output command referring to the file data of the SLAT file system;
    determining a portion of the SLAT sub-pool corresponding to the designated file data, the determined portion being the one or more data blocks of the SLAT file system; and
    performing the one or more block-level operations on the one or more data blocks in accordance with the input/output command.

4. The method of claim 1, wherein the second storage class comprises higher performing storage devices than those of the first storage class, and the first storage class comprises higher performing storage devices than those of the third storage class.

5. The method of claim 1, further comprising:
    updating the mapping between the virtual address space and the one or more of the plurality of logical block addresses according to the performed moving step.

6. A data storage system comprising:
    a plurality of storage classes, each comprising one or more storage devices configured to store a plurality of data blocks;
    a top-level storage manager configured to manage storage resources across the plurality of storage classes; and
    a sub-LUN auto-tiering (SLAT) storage manager configured to:
    manage a SLAT sub-pool including a portion of storage resources of each of at least two of the storage classes allocated from the top-level storage manager;
    generate a common SLAT address space having a plurality of logical block addresses each corresponding to a data block of the SLAT sub-pool;
    map, according to a SLAT mapping, at least one of the plurality of logical block addresses in the SLAT address space to a virtual address space of a predetermined total capacity assigned to a SLAT file system; and
    maintain sets of block access statistics, each comprising read and/or write reference counters that are incremented on each non-sequential access of corresponding data blocks of the SLAT file system;
    determine to promote file data stored in the one or more data blocks when the sets of updated block access statistics indicate greater than a threshold count of the reference counters for the one or more data blocks over an adjustable promotion period;
    determining to demote the file data when the sets of updated block access statistics indicate less than a threshold count of the reference counters for the one or more data blocks over a demotion period defined as a multiple of the promotion period.

7. The data storage system of claim 6, wherein the SLAT storage manager comprises a statistics processor configured to:

update the first and second sets of block access statistics in response to one or more block-level operations being performed on designated one or more data blocks of the SLAT file system, the one or more data blocks being of a first storage class.

8. The data storage system of claim 7, wherein the SLAT storage manager is further configured to:
move the file data to data blocks of a second storage class when it is determined to promote the file data; and
move the file data to data blocks of a third storage class when it is determined to demote the file data.

9. The data storage system of claim 8, wherein the SLAT storage manager is further configured to:
update the SLAT mapping between the virtual address space and the one or more of the plurality of logical block addresses in accordance with moving the file data.

10. The data storage system of claim 6, wherein one of the first or second set of block access statistics is derived from the other of the first or second set of block access statistics.

11. The data storage system of claim 6, wherein the SLAT storage manager comprises:
an input/output module configured to receive an input/output command referring to designated file data of the SLAT file system; and
a block processing module configured to:
determine a portion of the SLAT sub-pool corresponding to the designated file data, the determined portion being the one or more data blocks of the SLAT file system; and
perform the one or more block-level operations on the one or more data blocks in accordance with the input/output command.

12. The data storage system of claim 6, wherein the second storage class comprises higher performing storage devices than those of the first storage class, and the first storage class comprises higher performing storage devices than those of the third storage class.

13. A computer-implemented sub-LUN auto-tiering (SLAT) storage manager system, in communication with a plurality of storage classes, each comprising one or more storage devices configured to store a plurality of data blocks, and in communication with a top-level storage manager configured to manage storage resources across the plurality of storage classes, the system comprising:
a set of processors; and
a non-transient memory having instructions stored thereon, which, when executed, cause the set of processors to perform steps comprising:
managing a SLAT sub-pool including a portion of storage resources of each of at least two of the storage classes allocated from the top-level storage manager, such that the SLAT sub-pool comprises a common SLAT address space having a plurality of logical block addresses each corresponding to a data block of the SLAT sub-pool, and at least one of the plurality of logical block addresses in the SLAT address space is mapped, according to a SLAT mapping, to a virtual address space of a predetermined total capacity assigned to a SLAT file system; and
updating sets of block access statistics in response to performing one or more block-level operations on one or more data blocks of the SLAT file system, the sets of block access statistics comprising read and/or write reference counters that are incremented on each non-sequential access of a corresponding data block of the SLAT file system,
determining to promote file data stored in the one or more data blocks when the sets of updated block access statistics indicate greater than a threshold count of the reference counters for the one or more data blocks over an adjustable promotion period;
determining to demote the file data when the sets of updated block access statistics indicate less than a threshold count of the reference counters for the one or more data blocks over a demotion period defined as a multiple of the promotion period.

14. The system of claim 13, wherein the instructions, when executed, cause the set of processors to perform steps further comprising:
moving the file data to data blocks of a second storage class when it is determined to promote the file data; and
moving the file data to data blocks of a third storage class when it is determined to demote the file data.

* * * * *

UNITED STATES PATENT AND TRADEMARK OFFICE
CERTIFICATE OF CORRECTION

PATENT NO. : 9,575,690 B2  
APPLICATION NO. : 14/340700  
DATED : February 21, 2017  
INVENTOR(S) : Burton et al.

It is certified that error appears in the above-identified patent and that said Letters Patent is hereby corrected as shown below:

In the Specification

In Column 14, Line 26, delete "IO" and insert -- I/O --, therefor.

In Column 14, Line 27, delete "IO" and insert -- I/O --, therefor.

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*